(12) United States Patent
Itou et al.

(10) Patent No.: US 7,088,409 B2
(45) Date of Patent: Aug. 8, 2006

(54) LIQUID CRYSTAL DISPLAY APPARATUS

(75) Inventors: Osamu Itou, Hitachi (JP); Junji Tanno, Narashino (JP); Hirotaka Imayama, Mobara (JP); Takahiro Ochiai, Chiba (JP); Masateru Morimoto, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 0 days.

(21) Appl. No.: 11/135,828

(22) Filed: May 23, 2005

(65) Prior Publication Data

US 2005/0264731 A1 Dec. 1, 2005

(30) Foreign Application Priority Data

May 25, 2004 (JP) ............................. 2004-154691

(51) Int. Cl.
*G02F 1/1335* (2006.01)
(52) U.S. Cl. ..................... 349/114; 349/117; 349/141
(58) Field of Classification Search ............. 349/114, 349/141
See application file for complete search history.

(56) References Cited

U.S. PATENT DOCUMENTS 6,583,840 B1 * 6/2003 Inoue et al. ............... 349/141
6,608,660 B1 * 8/2003 Okamoto et al. .......... 349/113
6,611,310 B1 * 8/2003 Kurahashi et al. ......... 349/141
6,914,656 B1 * 7/2005 Sakamoto et al. ......... 349/141
2001/0048496 A1 * 12/2001 Baek ......................... 349/114
2001/0052948 A1 * 12/2001 Okamoto et al. ........... 349/12

FOREIGN PATENT DOCUMENTS

| JP | 11-242226 | 9/1999 |
|---|---|---|
| JP | 2003/279957 | 10/2003 |
| WO | 2004/015486 | 2/2004 |

* cited by examiner

*Primary Examiner*—James A. Dudek
(74) *Attorney, Agent, or Firm*—Hogan & Hartson, LLP

(57) ABSTRACT

A liquid crystal display of a transflective IPS system in which a lateral electric field is applied to a liquid crystal layer. Polarization films are arranged on the entire surface of a transmissive display unit and a reflective display unit in a manner similar to a transmissive IPS system. An inner retardation layer whose retardation is equal to a half wave is formed in the reflective display unit. A retardation of the liquid crystal layer of the reflective display unit is set to a quarter wave. Thus, a reflective display can be performed in a wide range of environment from a light place to a dark place and a transmissive display of a wide viewing angle and high picture quality can be performed.

7 Claims, 19 Drawing Sheets

LIQUID CRYSTAL DISPLAY APPARATUS

CROSS-REFERENCE TO RELATED APPLICATION

This application claims benefit of priority under 35 U.S.C. § 119 to Japanese Patent Application No. 2004-154691 filed May 25, 2004, the entire contents of which are incorporated by reference.

BACKGROUND OF THE INVENTION

1. Field of the Invention

The invention relates to a liquid crystal display which can display images in a wide range of environment from a light place to a dark place and execute a transmissive display with a wide viewing angle and high picture quality.

2. Description of the Related Art

At present, a transmissive liquid crystal display of an IPS (In Plane Switching) system, a VA (Vertical Alignment) system, or the like has been spread as a monitor and is also used as a television by improving response performance. A liquid crystal display has also been spread to the fields of portable information apparatuses such as cellular phone and digital camera. Although the portable information apparatus is mainly used personally, in recent years, the number of portable information apparatuses in which an inclination angle of a display unit can be varied has been increased and the display unit is often observed from the oblique direction. Therefore, a wide viewing angle is demanded.

Since the display for the portable information apparatus is used in a variety of environments in ranges from the outdoors in the fine weather to the darkroom, it is demanded that the display is transflective. In the transflective liquid crystal display, a reflective display unit and a transmissive display unit are arranged in one pixel.

In this case, the reflective display unit performs a display by reflecting a light entering from the ambience with use of a reflection layer and a contrast ratio is kept constant irrespective of the ambient brightness, so that a good display state can be obtained under a relatively light environment in ranges from the outdoors in the fine weather to the interior of the room. According to the transmissive display unit, since a backlight is used and the brightness is kept constant irrespective of the environment, a display of a high contrast ratio can be obtained in a relatively dark environment in ranges from the interior of the room to the darkroom. According to the transflective liquid crystal display having functions of both of them, a display of the high contrast ratio can be obtained in a wide range of environment from the outdoors in the fine weather to the darkroom.

Hitherto, it has been expected that the reflective display and the transmissive display of a wide viewing angle are simultaneously obtained by constructing the display of the IPS system known as a transmissive display of the wide viewing angle as a transflective type. The transflective IPS system has been disclosed in, for example, JP-A-11-242226.

In the liquid crystal display of the transflective IPS system, although a plurality of retardation films are arranged on the whole upper and lower surfaces of a liquid crystal panel, phase differences among the retardation films have viewing angle dependency. Therefore, even if the phase differences among the liquid crystal layer and the plurality of retardation films and an axis layout are optimized in a normal direction, as a viewing point gets away from the normal direction, conditions rapidly deteriorate to be away from optimum conditions for the dark display.

Although the viewing angle dependency of the phase differences can be reduced by adjusting a refractive index in the thickness direction of the retardation films, it cannot be completely eliminated. In the transflective IPS system, thus, an increase in dark display transmissive ratio in the oblique direction is large and viewing angle performance of the transmissive display is inferior to that of the transmissive IPS system.

According to JP-A-2003-279957, in the VA system, retardation films are arranged in close vicinity to the liquid crystal layer, patterned, and arranged only in the reflective display unit. However, nothing is disclosed with respect to application to the IPS system which provides the transmissive display with the wide viewing angle.

According to the transmissive IPS system, the liquid crystal layer has homogeneous alignment, upper and lower polarization films are arranged so that their transmissive axes cross perpendicularly, and one of the transmissive axes is parallel with the liquid crystal alignment direction. Since the light entering the liquid crystal layer is linearly polarized light and its electric vector is parallel with the liquid crystal alignment direction, the phase differences are not obtained by the liquid crystal layer. Therefore, since a dark display of a low transmissive ratio can be realized and no retardation films exist between the liquid crystal layer and the polarization films, a surplus phase difference does not occur in the oblique direction and the dark display with the wide viewing angle can be realized. As mentioned above, the retardation films are inherently unnecessary in the transmissive IPS system.

In the liquid crystal display of the transflective IPS system, the reflective display unit and the transmissive display unit in which optical conditions for the dark display are essentially different are arranged in one pixel. That is, in the reflective display unit, the light enters from the polarization film on the upper surface of the liquid crystal display, is reflected by the reflection layer in the liquid crystal panel, thereafter, passes through the upper polarization film again, and is directed toward the user. In the transmissive display unit, the light enters from the polarization film on the lower surface of the liquid crystal display, thereafter, passes through the polarization film on the upper surface of the liquid crystal display, and is directed toward the user. The phase difference between the phase of the light which provides the dark display in the reflective display unit and that in the transmissive display unit is caused due to such a difference between optical paths and it is equal to a quarter wave. Therefore, when the reflective display unit is in the light display mode, the transmissive display unit is in the dark display mode or vice versa, and the reflective display unit and the transmissive display unit have different applied voltage dependency. To allow those display units to have the same applied voltage dependency, the phase difference between the reflective display unit and the transmissive display unit has to be shifted by the quarter wave by some method.

According to the conventional transflective IPS system, the retardation films are arranged on the whole upper and lower surfaces of the liquid crystal panel. The light which enters the reflective display unit from the outside, the light reflected by the reflection layer of the reflective display unit, and the light which passed through the transmissive display unit pass through the retardation films on the upper side of the liquid crystal panel among those retardation films. As mentioned above, the upper retardation films act on both of the reflective display unit and the transmissive display unit. On the other hand, since only the light which is emitted from a light source and enters the transmissive display unit passes through the retardation films on the lower side of the liquid crystal panel, the lower retardation films act only on the transmissive display unit. By using a difference between the actions of the upper retardation films and the lower retardation films onto the reflective display unit and the transmissive display unit, the phase difference between both of the display units is shifted by the quarter wave. However, since the surplus phase difference occurs in the oblique direction since the retardation films exist between the liquid crystal layer and the polarization films, the viewing angle performance of the dark display deteriorates.

SUMMARY OF THE INVENTION

As mentioned above, according to the conventional transflective liquid crystal display, a wide viewing angle similar to that of the transmissive IPS system cannot be realized. It is, therefore, an object of the invention to realize a wide viewing angle similar to that of the transmissive IPS system in the transflective liquid crystal display.

According to the invention, retardation films are arranged only in a reflective display unit of the transflective IPS system and polarization films which are used for the reflective display unit and the transmissive display unit have common specifications. The polarization films are arranged on the whole upper and lower surfaces of a liquid crystal panel, and the retardation films are formed as an inner retardation layer in the liquid crystal panel, patterned, and formed only in the reflective display unit. At this time, by arranging the upper and lower polarization films in a manner similar to that in the transmissive IPS system (their transmissive axes perpendicularly cross each other and one of them is parallel with a liquid crystal alignment direction), the same transmissive display viewing angle performance as that of the transmissive IPS system is obtained.

After the polarization films are formed in a manner similar to that in the transmissive IPS system, the inner retardation layer is arranged so as to shift a phase difference between the reflective display unit and the transmissive display unit by a quarter wave. Specifically speaking, a laminate of the liquid crystal layer and the inner retardation layer is arranged like a quarter wave plate of a wide band. That is, the retardation of one of them near the reflection layer is set to the quarter wave and that of the other is set to the half wave.

According to the IPS system, a layout of the liquid crystal layer is changed so that mainly a director azimuth is rotated in the layer when a voltage is applied, a change in tilt angle is small, and the retardation hardly changes. Therefore, between the liquid crystal layer and the retardation films, the liquid crystal layer is arranged in close vicinity to a reflective electrode and its retardation is set to the quarter wave.

A slow axis of the inner retardation layer is determined as follows. An azimuth is defined counterclockwise by setting a transmissive axis of the upper polarization film to 0°. When a slow axis azimuth of the inner retardation layer is assumed to be $\theta_{PH}$ and an azimuth of the alignment direction of the liquid crystal layer is assumed to be $\theta_{LC}$, an azimuth in the case of the quarter wave plate of the wide band is shown by the following expression (1). A method of obtaining the expression (1) will be described hereinafter.

$$2\theta_{PH} = \pm 45° + \theta_{LC} \qquad (1)$$

where, $\theta_{LC}$ has to be set to either 0° or ±90° since the layout of the polarization films in the transmissive display unit is similar to that of the transmissive IPS. Thus, $\theta_{PH}$ is equal to ±22.5° (a range from 20° or more to 25° or less in consideration of an allowance of ±10% in manufacturing) or ±67.5° (a range from 60° or more to 75° or less in consideration of an allowance of ±10% in manufacturing). By arranging the laminate of the liquid crystal layer and the inner retardation layer like a quarter wave plate of the wide band, a reflective ratio of the whole visible wavelength region decreases and an achromatic reflection display of the small reflective ratio is obtained.

Between the reflective display unit and the transmissive display unit, the optimum values of the liquid crystal layer retardation to set the reflective ratio and the transmissive ratio to the maximum which is determined by light absorption of the polarization films are different. In the reflective display unit, the optimum value is set to the quarter wave. In the transmissive display unit, it is set to the half wave. To realize those values, a thickness of liquid crystal layer of the reflective display unit has to be set to be smaller than that of the transmissive display unit. Specifically speaking, a thickness adjustment layer is arranged in the reflective display unit and the thickness of liquid crystal layer of the reflective display unit is reduced by an amount corresponding to a thickness of thickness adjustment layer. The thickness adjustment layer has to be arranged so as to correspond to the reflective display unit.

In the invention, although the inner retardation layer is used, it is also arranged so as to correspond to the reflective display unit. A difference between the retardation necessary for the reflective display unit and the transmissive display unit is equal to the quarter wave and the retardation necessary for the inner retardation layer is equal to the half wave.

Therefore, if a bireflingence of the inner retardation layer is equal to or more than two times of that of the liquid crystal layer, a thickness of inner retardation layer is smaller than a difference between the liquid crystal layer thicknesses necessary for the reflective display unit and the transmissive display unit. In such a case, it is preferable that the inner retardation layer and the thickness adjustment layer are laminated and patterned so as to correspond to the reflective display unit, and a total of the layer thicknesses of both of them is set to the liquid crystal layer thickness difference necessary for the reflective display unit and the transmissive display unit.

If the bireflingence of the inner retardation layer is equal to two times of that of the liquid crystal layer, the thickness of inner retardation layer is equal to the liquid crystal layer thickness difference necessary for the reflective display unit and the transmissive display unit. In this case, since the thickness adjustment layer is unnecessary, the manufacturing steps can be simplified.

According to the invention, an all-environment type liquid crystal display with a wide viewing angle can be realized. That is, an all-environment type display which can display in various environments ranging from the outdoors in the fine weather to the darkroom is realized and, in the transmissive display, the display of a wide viewing angle similar to that of a monitor is obtained.

The display with high picture quality similar to that of the monitor can be carried. If it is used as a display of a cellular phone, image information of high picture quality can be reconstructed and the more advanced image information can be handled. Further, if it is used for a digital camera, an image before photographing and the photographed image can be easily confirmed. It is also presumed that a receiving state of a portable television will be remarkably improved in future in association with the spread of terrestrial digital broadcasting. If it is used for a portable television, the image information of high picture quality can be reproduced in any place.

Other objects, features and advantages of the invention will become apparent from the following description of the embodiments of the invention taken in conjunction with the accompanying drawings.

BRIEF DESCRIPTION OF THE DRAWINGS

FIGS. 5 and 9 are seen from the S3-axis direction;

FIG. 9 is a display diagram of the Poincare' sphere showing the polarization converting function of retardation films and a liquid crystal layer in the reflective display unit;

DETAILED DESCRIPTION OF THE EMBODIMENTS

Embodiments of the invention will be described hereinbelow with reference to the drawings.

[Embodiment 1]

Figure 1:
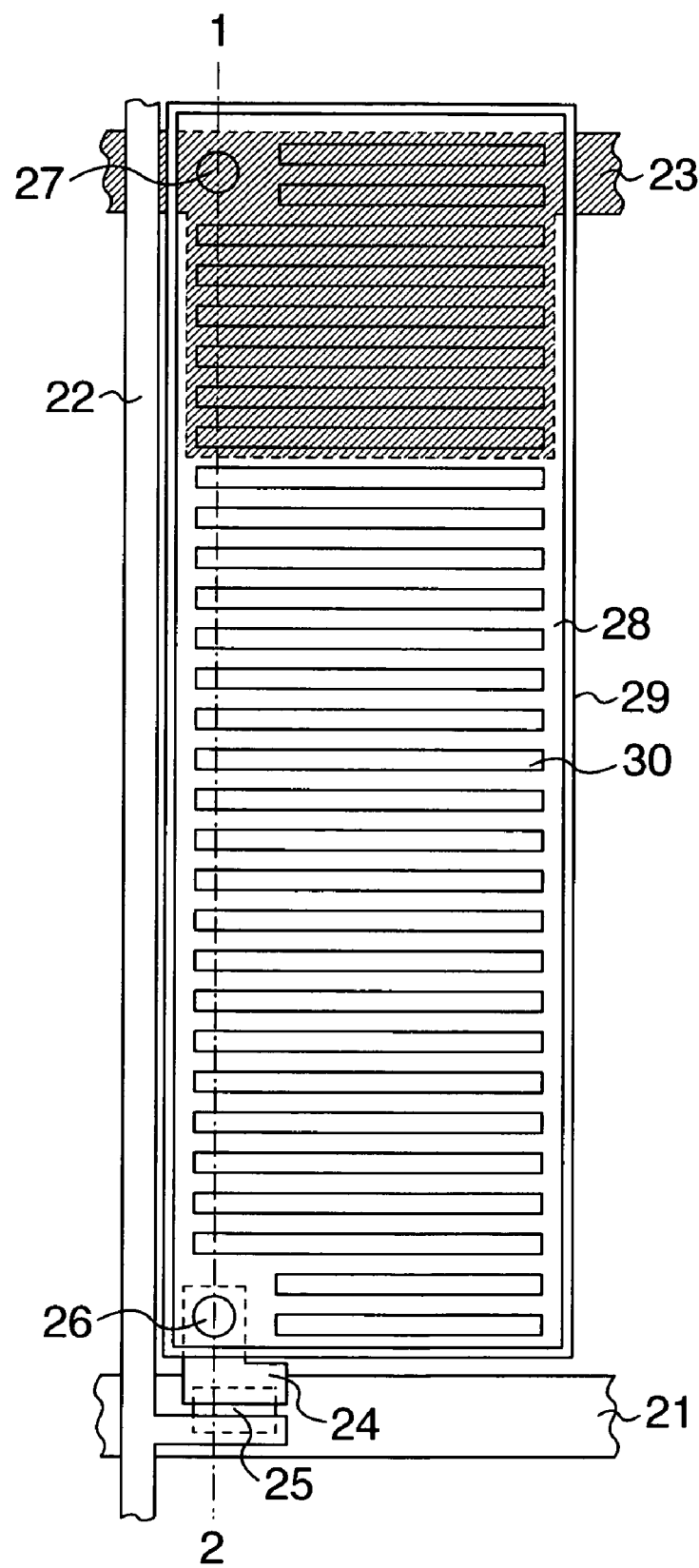
FIG. 1 is a diagram showing various lines and electrode distribution in one pixel on a second substrate of a liquid crystal display according to the embodiment 1.
Figure 2:
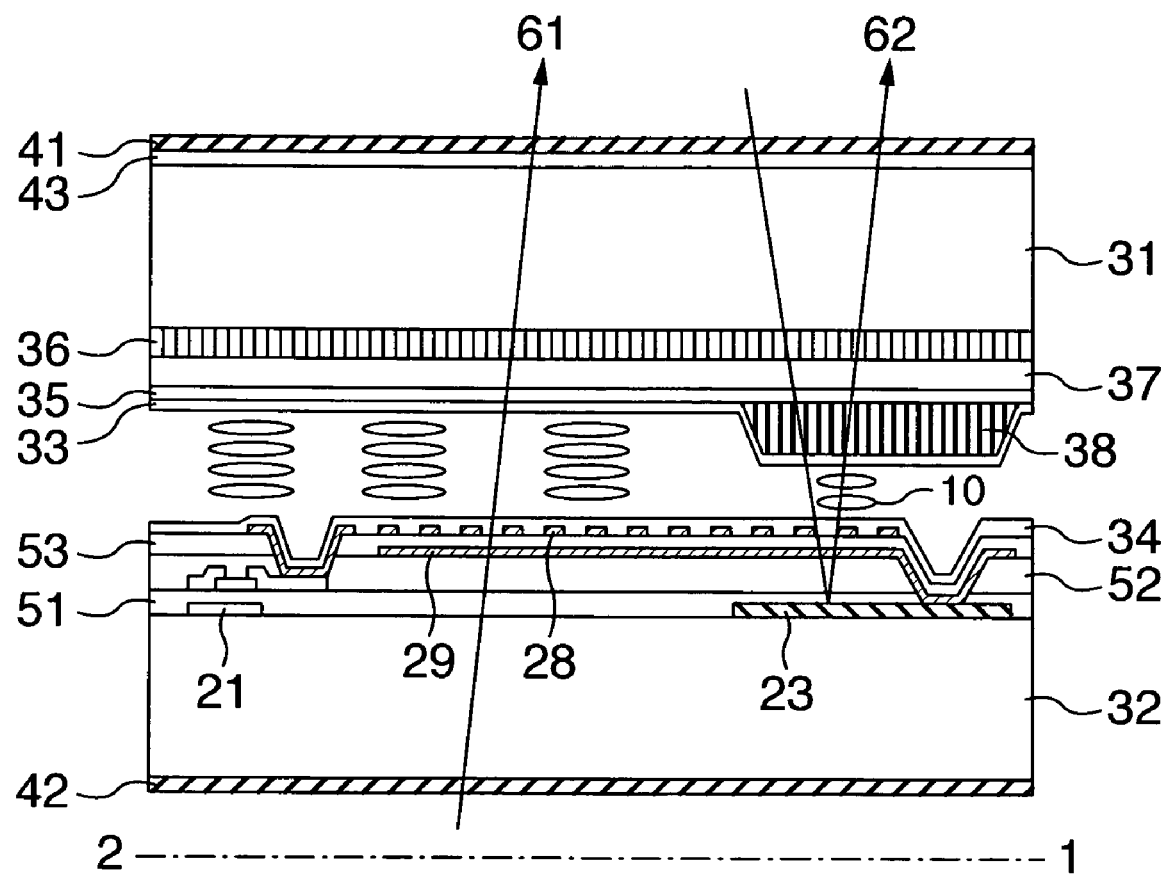
FIG. 2 is a diagram showing a cross section of one pixel of the liquid crystal display of the embodiment 1.

A cross sectional view of one pixel constructing a liquid crystal display according to the invention is shown in FIG. 2. A top view when a second substrate 32 is observed from the normal direction is shown in FIG. 1. A cross sectional view taken along an alternate long and short dash line 1-2 shown in FIG. 1 is also FIG. 2. The liquid crystal display of the invention is constructed mainly by a first substrate 31, a liquid crystal layer 10, and the second substrate 32. The liquid crystal layer 10 is sandwiched between the first substrate 31 and the second substrate 32. On the side near the liquid crystal layer 10, the first substrate 31 has a color filter 36, a leveling layer 37, a third alignment layer 35, an inner retardation layer 38, and a first alignment layer 33.

On the side near the liquid crystal layer 10, the second substrate 32 has a thin film transistor. The thin film transistor is connected to a scanning line 21, a signal line 22, and a pixel electrode 28. Besides them, the second substrate 32 has a common line 23 and a common electrode 29. The thin film transistor has an anti stagger structure and its channel portion is made of an amorphous silicon layer 25. The scanning line 21 and the signal line 22 cross each other and the thin film transistor is located approximately in such a crossing portion.

The common line 23 is distributed in parallel with the scanning line 21 and connected through a second through hole 27. The pixel electrode 28 and the thin film transistor are coupled via a first through hole 26. A second alignment layer 34 is formed on the pixel electrode 28 and arranged in close vicinity to the liquid crystal layer 10, thereby specifying its alignment direction.

The first substrate 31 is made of borosilicate glass hardly containing ionizable impurities and has a thickness of 0.5 mm. The color filter 36 is constructed by repetitively arranging red, green, and blue portions in a stripe shape and each stripe is parallel with the signal line 22. A rough surface caused by the color filter 36 is flattened by the leveling layer 37 made of a resin. The first alignment layer 33 is a polyimide organic layer and is aligned by a rubbing method, thereby aligning the close liquid crystal layer 10 in the alignment processing direction.

The second substrate 32 is made of borosilicate glass and has a thickness of 0.5 mm in a manner similar to the first substrate 31. The second alignment layer 34 is a polyimide organic layer having horizontal alignment performance in a manner similar to the first alignment layer 33. Each of the signal line 22, the scanning line 21, and the common line 23 is made of chromium. The pixel electrode 28 is transparent electrodes made of indium tin oxide (ITO). A part of the common electrode 29 is also made of ITO.

The pixel electrode 28 has slits 30 which are parallel with the scanning line 21 and a pitch of the slits 30 is equal to about 4 μm. The pixel electrode 28 and the common electrode 29 are partitioned by a third insulation layer 53 having a thickness of 0.5 μm. Although an electric field is formed between the pixel electrode 28 and the common electrode 29 when a voltage is applied, the electric field is distorted in an arch shape by an influence of the third insulation layer 53 and passes in the liquid crystal layer 10. Thus, an alignment change occurs in the liquid crystal layer 10 when the voltage is applied.

In the portion where the common line 23 crosses the pixel electrode 28, the common line 23 has a structure in which it is protruded into the pixel electrode 28 and reflects light as shown as reflective light 62 in FIG. 2. In FIGS. 1 and 2, the portion where the common line 23 is overlapped with the pixel electrode 28 corresponds to the reflective display unit and other overlapped portion of the pixel electrode 28 and the common electrode 29 becomes a transmissive display unit which passes the light of the backlight as shown by transmissive light 61 in FIG. 2. Since optimum liquid crystal layer thicknesses in the reflective display unit and the transmissive display unit are different, a step is formed at a boundary between them. To shorten the boundary between the transmissive display unit and the reflective display unit, the transmissive display unit and the reflective display unit are arranged so that the boundary is parallel with a short side of the pixel.

In this embodiment, the transmissive display portion is a portion that becomes transparent when the first substrate 31 is combined with the second substrate 32 so that the portion may pass the backlight and causes the liquid crystal layer 10 to be operated by the electric field applied thereon. Further, the reflective display portion is a portion that becomes opaque when the first substrate 31 is combined with the second substrate 32 so that the portion may cut off the backlight, includes a metallic layer with a high reflectance so that the metallic layer may reflect ambient light, and causes the liquid crystal layer 10 to be operated by the electric field applied thereon.

If the lines such as a common line 23 and the like are used in common for the reflection layer, the effect of reducing the manufacturing steps is obtained. If the common line 23 is made of aluminum with high reflective ratio, the brighter reflection display is obtained. A similar effect can be obtained even if the common line 23 is made of chromium and the reflection layer made of aluminum or silver alloy is separately formed.

The liquid crystal layer 10 is a liquid crystal composition showing positive dielectric constant anisotropy in which a dielectric constant in the alignment direction is larger than that in its normal direction. Its bireflingence is equal to 0.067 at 25° C. and the liquid crystal layer 10 exhibits a nematic phase in a temperature range including a room temperature region. For a holding period of time when the display is driven at a frequency of 60 Hz by using the thin film transistor, a high resistance value in which the sufficient reflective ratio and transmissive ratio are held and no flickers are caused is shown.

The inner retardation layer 38 is formed on the first substrate 31 where the color filter 36 and the leveling layer 37 have been formed. Its forming method is as follows.

The third alignment layer 35 having the horizontal alignment performance is coated onto the leveling layer 37, baked, and subjected to an alignment process by the rubbing method. The third alignment layer 35 has a function of determining a slow axis direction of the inner retardation layer 38. An organic solvent containing a liquid crystal having a photoreactive acryl group at a molecule end and an initiator is coated onto the third alignment layer 35 and heated, thereby removing the organic solvent. At this point of time, the photoreactive liquid crystal is aligned in the alignment processing direction of the third alignment layer 35. Subsequently, by irradiating ultraviolet rays, the acryl group is photopolymerized and a film is formed, thereby obtaining the inner retardation layer 38. The film thickness is adjusted by properly controlling a solution concentration and coating conditions upon coating, thereby setting the retardation of the inner retardation layer 38 to the half wave at a wavelength of 550 nm.

Since the inner retardation layer 38 is made of a liquid crystal polymer, its alignment performance of the molecules is higher than that of the retardation films formed by drawing an organic polymer film and the layer 38 has the alignment performance similar to that of the liquid crystal layer 10. Therefore, Δn of the inner retardation layer 38 is fairly larger than that of the externally attached retardation films and can be set to a value which is almost equal to or larger than that of the liquid crystal layer 10 by properly adjusting the molecular structure and film forming conditions. Although a thickness of externally attached retardation films is equal to tens of μm and is about ten times as that of the liquid crystal layer, the thickness of inner retardation layer 38 can be fairly reduced by using the liquid crystal polymer and be set to be thinner than the step between the reflective display unit and the transmissive display unit. Thus, even if the inner retardation layer 38 is patterned in accordance with the reflective display unit, the special leveling is unnecessary.

Subsequently, the inner retardation layer 38 is patterned so as to have distribution similar to that of the reflective display unit. A resist is coated onto the inner retardation layer 38 and patterned so as to have the distribution similar to that of the reflective display unit. After that, it is ashed with an oxygen plasma, thereby removing the inner retardation layer in the portion where the resist is not distributed.

A shift may take place when the first substrate 31 is combined with the second substrate 32. At a time, when viewing the combination of the first substrate 31 and the second substrate 32 from the normal direction of the substrate, built-in phase plates 38 may be distributed in the transparent portion of the second substrate. In this portion, when no voltage is applied, the built-in phase plates 38 serve to change the polarized state of the transmitted light and thereby generate the components to be transmitted through the first polarizer 41. As a result, the backlight is passed therethrough, so that the transmittance may not be sufficiently reduced on the dark image and the contrast ratio of the transmissive display may be lowered.

Also, an area where no built-in phase plate 38 is distributed may occur on the reflective electrode. In this portion, when no voltage is applied, since the light reaching the reflective plate is not made to be circularly polarized light, when the light is reflected on the reflective plate and again reaches the first polarizer 41, the components that are allowed to pass through the first polarizer 41 are generated. As a result, the reflectance on the dark image is not sufficiently reduced and the contrast ratio in the reflective display is made lower.

In order to prevent the contrast ratio of the transmissive display from being lowered in the case that the shift takes place when the first substrate 31 is combined with the second substrate 32, the distribution of the built-in phase plates 38 is formed to be smaller than the reflective display portion as keeping the correspondence between the distribution and the reflective display portion. For example, in a case that it is presumed that the shift occurring in combining the first substrate 31 with the second substrate 32 is made to be 2 μm at maximum, the distribution of the built-in phase plates 38 is formed to be smaller by 2 μm than the reflective display portion. Even if the shift of the first substrate 31 to the second substrate 32 becomes the maximum, this formation makes it possible to prevent the built-in phase plates 38 from being distributed in the transparent portion of the second substrate and the contrast ratio in the transmissive display from being lowered.

If the built-in phase plates 38 are not distributed in the transmissive display portion, the contrast ratio of the transmissive display is not made lower. For that purpose, it is possible to distribute the built-in phase plates 38 in the overall portion that becomes opaque when the first substrate 31 is combined with the second substrate 32. Or, it is possible to distribute the built-in phase plates 38 in the part of the opaque portion that is not in the reflective display portion as distributing them in the reflective display portion. This makes it possible to simplify the distribution form of the built-in phase plates 38, for example, make the form stripped. By simplifying the distribution form of the built-in phase plates 38, the patterning accuracy may be improved. The improvement of the patterning accuracy leads to preventing distribution of the built-in phase plates 38 in the transmissive display portion.

At this time, if a layer whose Δn is larger than two times of that of the liquid crystal layer is used as an inner retardation layer 38, the thickness when the retardation of the inner retardation layer 38 is set to the half wave is insufficient. If the inner retardation layer 38 only is used, a difference of the retardation between the reflective display unit and the transmissive display unit is smaller than the quarter wave. By leaving the resist without completely removing it from the upper surface of the inner retardation layer 38, the thickness of the inner retardation layer 38 is set to a value enough to form the retardation difference of the quarter wave between the liquid crystal layer in the reflective display unit and that in the transmissive display unit.

As the slit 30 is made narrower, the vertical components of the electric field are increased accordingly. In such a case, when a voltage is applied, the tilt angle in the alignment direction of the liquid crystal is made large enough not to be negligible. The retardation of the liquid crystal layer in the transmissive display portion is made far smaller than a half wave and the transmittance in the bright image is also reduced. In such a case, for preventing reduction of the transmittance on the bright image, the retardation of the liquid crystal layer in the transmissive display portion is required to be more than a half wave. For example, it is preferable to enhance the retardation up to about a three-quarters wave. Further, it is preferable to set the difference of retardation between the liquid crystal layer of the transmissive display portion and that of the reflective display portion to be more than a quarter wave. In order to make the retardation of the built-in phase plates 38 a half wave and then make the difference of the retardation between the liquid crystal layer of the transmissive display portion and the liquid crystal layer of the reflective display portion larger than a quarter wave, it is effective to form the difference of the retardation by any other portion except the built-in phase plates 38.

After the first alignment layer 33 and the second alignment layer 34 are rubbing-processed so as to be inclined by 15° from the signal line 22, the first substrate 31 and the second substrate 32 are assembled, and a liquid crystal material is sealed, thereby forming the liquid crystal layer 10. A first polarization film 41 and a second polarization film 42 are arranged outside of the first substrate 31 and the second substrate 32. The first polarization film 41 and the second polarization film 42 are arranged so that a transmissive axis of the film 41 perpendicularly crosses the liquid crystal alignment direction and a transmissive axis of the film 42 is parallel with the liquid crystal alignment direction.

An adhesive layer 43 having light diffusion performance in which a number of transparent micro spheres are mixed and whose refractive index differs from that of an adhesive material is used as an adhesive layer of the first polarization film 41. The first polarization film 41 has a function of enlarging an optical path of the incident light by using an effect of refraction which is caused since the refractive indices of both of them are different at an interface between the adhesive material and the micro spheres. Thus, the reflected light can be obtained irrespective of the incident direction of external light. In addition to it, iridescent coloring which is caused by interference of the reflected light in the pixel electrode 28 and the common electrode 29 can be reduced.

Figure 3:
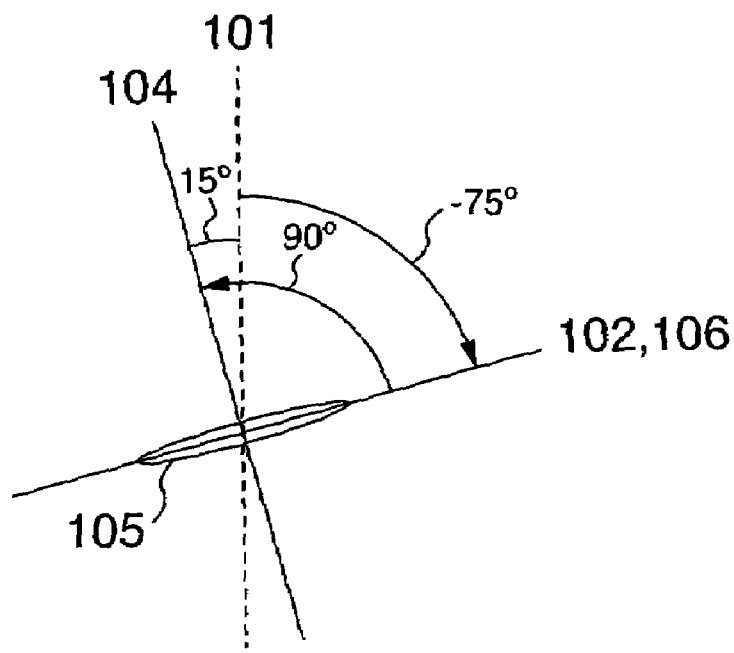
FIG. 3 is a diagram showing a layout of axes in a transmissive display unit of the liquid crystal display of the embodiment 1.

When attention is paid to the transmissive display unit of the transflective liquid crystal display of the embodiment manufactured as mentioned above, it is constructed by the liquid crystal layer 10 of homogeneous alignment, the first polarization film 41, and the second polarization film 42. When the liquid crystal alignment direction is observed from the substrate normal direction, it is as shown in FIG. 3. This diagram is a plan view of the transmissive display unit when seen from the normal direction on the side of the first substrate 31 after the first substrate 31 and the second substrate 32 are assembled. Reference numeral 101 denotes an azimuth of the signal line 22 and it is drawn in parallel with FIG. 1. A transmissive axis 104 of the first polarization film 41 perpendicularly crosses a transmissive axis 106 of the second polarization film 42. The transmissive axis 106 is parallel with a liquid crystal alignment direction 102. Since such a construction is similar to that of the transmissive IPS system, with respect to the transmissive display, a wide viewing angle which can also endure the application to the monitor is obtained in a manner similar to the transmissive IPS system.

Figure 4:
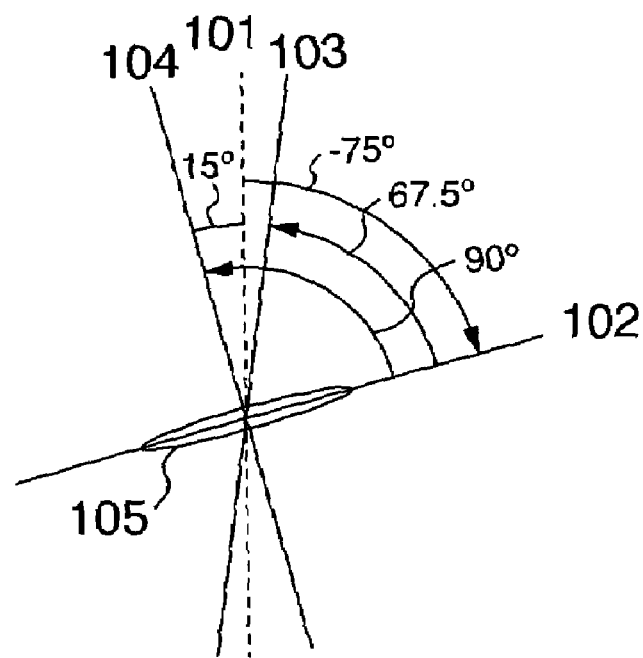
FIG. 4 is a diagram showing a layout of axes in a reflective display unit of the liquid crystal display of the embodiment 1.

Subsequently, when attention is paid to the reflective display unit, it is constructed by the liquid crystal layer 10 of homogeneous alignment, the inner retardation layer 38, and the first polarization film 41. FIG. 4 shows a correlation among a slow axis of the inner retardation layer 38, the liquid crystal alignment direction, and a transmissive axis angle of the first polarization film. Referring to the diagram, since the slits 30 of the pixel electrode 28 are vertical to the signal line 22, the electric field direction is parallel with the signal line direction 101. When the azimuth is defined counterclockwise, the liquid crystal alignment direction 102 is inclined by −75° from the electric field direction. Thus, an effect in which the alignment change upon applying a voltage is stabilized and a threshold voltage at which the alignment change occurs is reduced is obtained. A slow axis direction 103 of the inner retardation layer 38 is inclined by 67.5° from the liquid crystal alignment direction 102 and the transmissive axis 104 of the first polarization film is inclined by 90° from the liquid crystal alignment direction 102.

In addition, since the retardation of the liquid crystal layer 10 of the reflective display unit is set to a quarter wave and that of the inner retardation layer 38 is set to the half wave, respectively, in the reflective display unit, the laminate of the liquid crystal layer 10, the inner retardation layer 38, and the first polarization film 41 becomes a circular polarization layer of a wide band. When the voltage is not applied, the incident light becomes circularly polarized light or enters a polarizing state similar to it and enters the reflection layer in almost the whole region of a visible wavelength. After the reflection, when the light enters and the first polarization film again, their electric vectors become linearly polarized light which is parallel with an absorption axis of the first polarization film, so that the achromatic dark display is obtained.

The expression (1) to decide the slow axis azimuth of the inner retardation layer 38, the retardation of the inner retardation layer 38, and the retardation of the liquid crystal layer 10 are derived as follows by using a Poincare' sphere display. The Poincare' sphere display is defined in the space in which stokes parameters (S1, S2, S3) describing the polarizing state are set to three axes. Each point on the Poincare' sphere corresponds to the polarizing state in a one-to-one relational manner. For example, an intersection line (equator) with an (S1, S2) plane on the Poincare' sphere corresponds to the linearly polarized light. Crossing points (North Pole and South Pole) with the S3-axis correspond to the circularly polarized light. Others correspond to the elliptically polarized light. (S1, S2, S3) are expressed by the following expressions (2), (3), and (4) by using an arbitrary X-axial component Ex and an arbitrary Y-axial component Ey of an electric vector and a phase difference δ between Ex and Ey, respectively.

$$S1=(Ex^2-Ey^2)/(Ex^2+Ey^2) \quad (2)$$

$$S2=2ExEy \cos \delta/(Ex^2+Ey^2) \quad (3)$$

$$S3=2ExEy \sin \delta/(Ex^2+y^2) \quad (4)$$

A conversion of the polarizing state by the retardation film or the liquid crystal layer 10 without a twist is expressed as a rotation around a line which is included in the (S1, S2) plane on the Poincare' sphere and passes through the center of the Poincare' sphere. A rotational angle at this time is equal to ½ rotation if the retardation of the retardation film is equal to the half wave and to ¼ rotation if it is equal to the quarter wave.

Attention is paid to a step in which the incident light of a representative wavelength in the visible light region, for example, a wavelength of 550 nm at which human luminosity is the highest sequentially passes through the first polarization film 41, the inner retardation layer 38, and the liquid crystal layer 10 of the reflective display unit and reaches the pixel electrode 28 or the common electrode 29.

Figure 5:
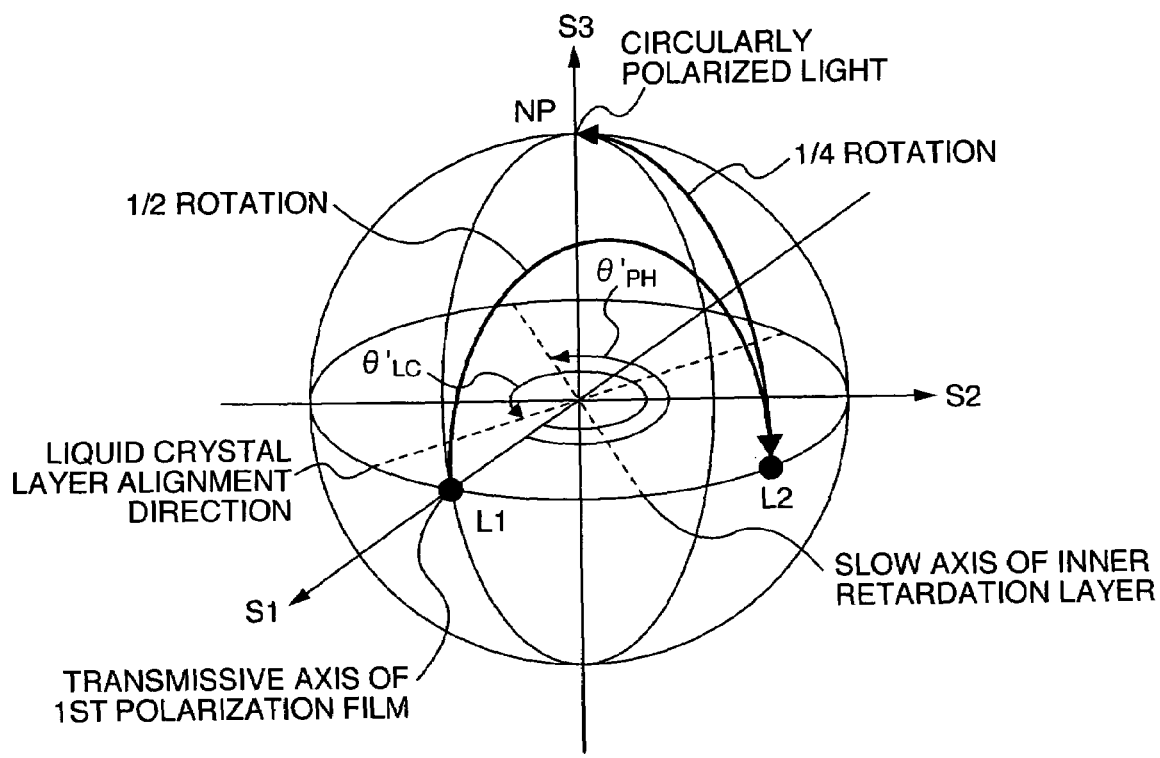
FIG. 5 is a display diagram of a Poincare' sphere showing a polarization converting function of retardation films and a liquid crystal layer in the reflective display unit.

Assuming that the Poincare' sphere is regarded as a globe, the crossing points with the S3-axis are called North Pole and South Pole, and the intersection line with the (S1, S2) plane is called an equator, as shown in FIG. 5, incident light L1 converted into linearly polarized light by the first polarization film 41 is located on the equator on the Poincare' sphere. However, it is rotated by ½ rotation around a rotation axis, as a rotational center, whose azimuth is equal to $\theta'_{PH}$ by the inner retardation layer 38, moved to another point L2 on the equator, and converted into linearly polarized light having a different electric vector. Subsequently, the light is rotated by ¼ rotation around a rotation axis, as a rotational center, whose azimuth is equal to $\theta'_{LC}$ by the liquid crystal layer 10, moved to North Pole NP, and converted into circularly polarized light.

Figure 6:
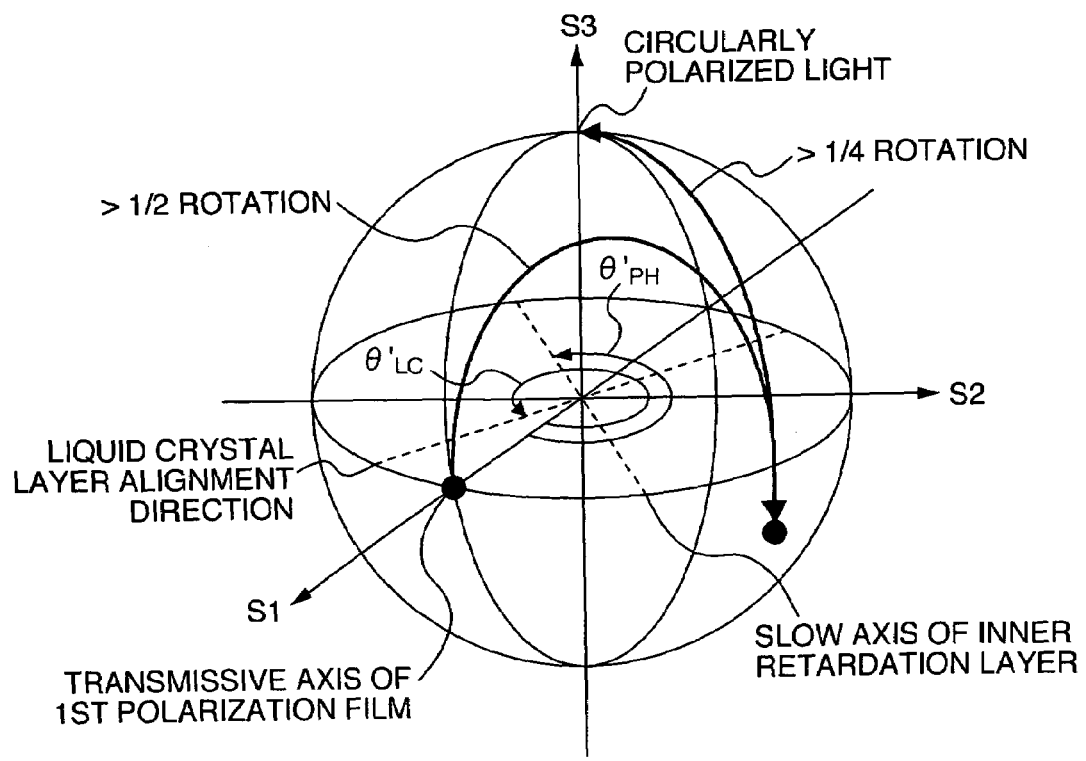
FIG. 6 is a display diagram of the Poincare' sphere showing the polarization converting function of retardation films and a liquid crystal layer in the reflective display unit of the light on a short wavelength side among visible wavelengths.
Figure 7:
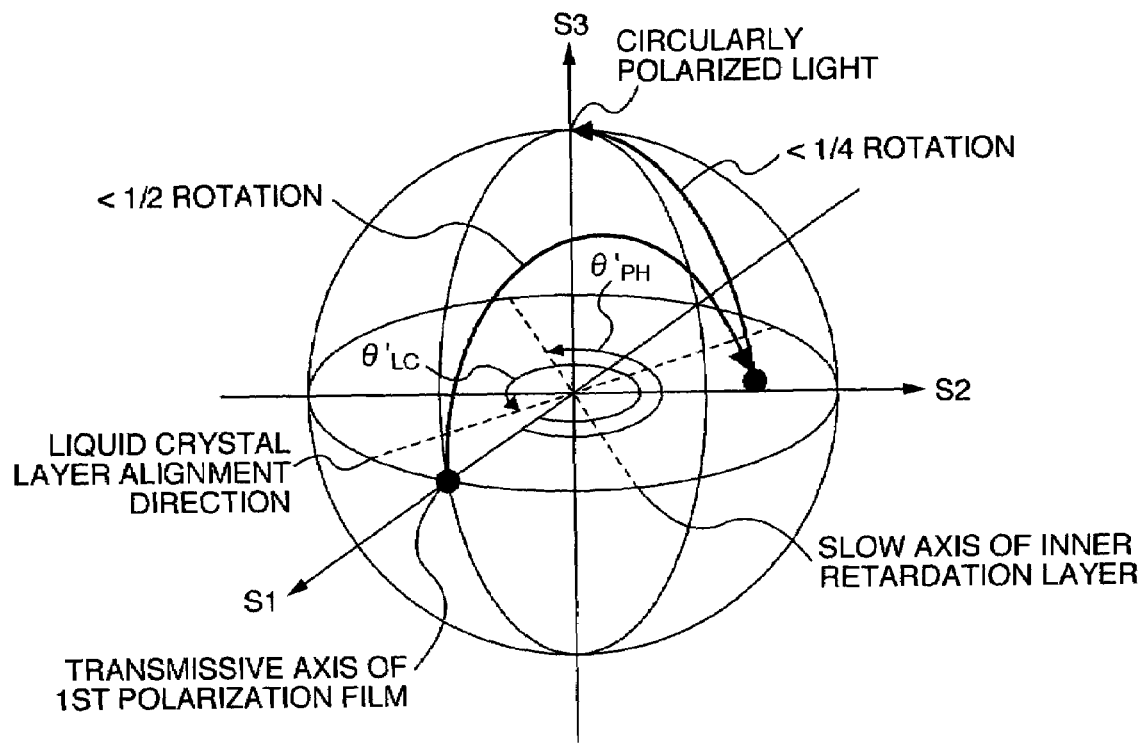
FIG. 7 is a display diagram of the Poincare' sphere showing the polarization converting function of retardation films and a liquid crystal layer in the reflective display unit of the light on a long wavelength side among visible wavelengths.

Subsequently, when attention is paid to the incident light of another wavelength, the retardation has wavelength dependency. In both the retardation film and the liquid crystal layer, the shorter the wavelength is, the larger the retardation is, and the longer the wavelength is, the smaller the retardation is. Therefore, the rotational angle differs depending on the wavelength. In the rotation by the inner retardation layer 38, the light of a wavelength other than 550 nm is not rotated by ½ rotation but moved to a point out of the equator. Since the retardation of the blue light on the short wavelength side is larger than the half wave, as shown in FIG. 6, the blue light is rotated by an angle larger than ½ rotation and moved to a position out of the equator. The retardation of the red light on the long wavelength side is smaller than the half wave, as shown in FIG. 7, the red light is rotated by an angle smaller than ½ rotation and moved to a position out of the equator.

However, in the rotation by the liquid crystal layer 10 which acts subsequently, since the moving direction becomes almost the opposite direction, a difference between the rotational angles due to the wavelength which is caused in the inner retardation layer 38 is compensated. That is, although the blue light on the short wavelength side is rotated by the angle larger than ¼ rotation even in the liquid crystal layer 10 as shown in FIG. 6, since its movement is started from the Southern Hemisphere, the light reaches a position just on the North Pole. As shown in FIG. 7, although the red light on the long wavelength side is rotated by the angle smaller than ¼ rotation even in the liquid crystal layer 10, since its movement is started from the Northern Hemisphere, the light reaches a position just on the North Pole by rotating the light by the angle smaller than ¼ rotation. Thus, the light of each wavelength is concentrated on a position near the North Pole and becomes almost the same circularly polarized light. When observing it as a display state of the liquid crystal, the achromatic dark display whose reflective ratio is reduced in a wide region of the visible wavelength is obtained.

Figure 8A:
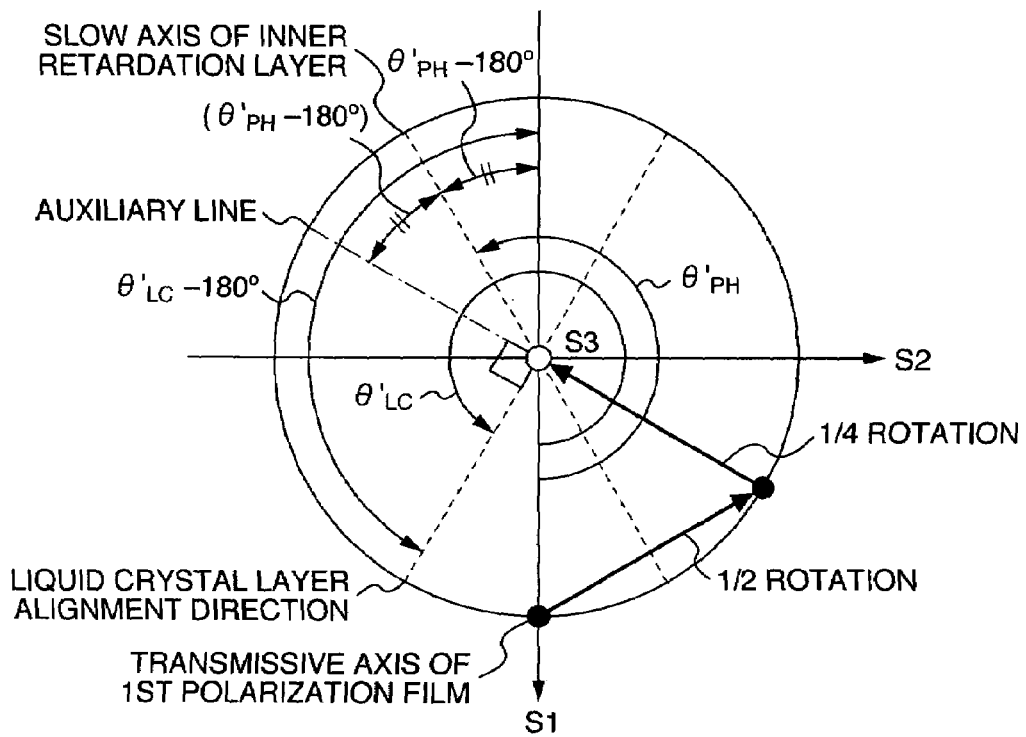
FIGS. 8A to 8D are diagrams when

From FIG. 5, since the function of the inner retardation layer 38 on the Poincare' sphere is equal to ½ rotation and that of the liquid crystal layer 10 on the Poincare' sphere is equal to ¼ rotation, respectively, the retardation of the inner retardation layer 38 at this time is obtained as a half wave and that of the liquid crystal layer 10 is obtained as a quarter wave, respectively. FIG. 8A obtained by seeing FIG. 5 from the S3-axis direction is used to clarify the relation between $\theta'_{PH}$ and $\theta'_{LC}$.

In FIG. 8A, an auxiliary line (alternate long and short dash line) drawn so as to extend the ¼ rotating direction is newly added. Since the auxiliary line is a prolonged line in the ¼ rotating direction, it perpendicularly crosses the liquid crystal alignment direction (azimuth $\theta'_{LC}$) indicative of the center of the rotation. The slow axis direction (azimuth $\theta'_{PH}$) of the inner retardation layer indicative of the center of the ½ rotation divides an angle between the S1-axis and the auxiliary line into two equal angles. The angle obtained by dividing the angle between the S1-axis and the auxiliary line into the two equal angles is equal to $\theta'_{PH}-180°$. Since $\theta'_{LC}-180°$ is equal to $(\theta'_{PH}-180°)\times 2+90°$, the following expression (5) is obtained.

$$2\theta'_{PH}=90°+\theta'_{LC} \tag{5}$$

Figure 9:
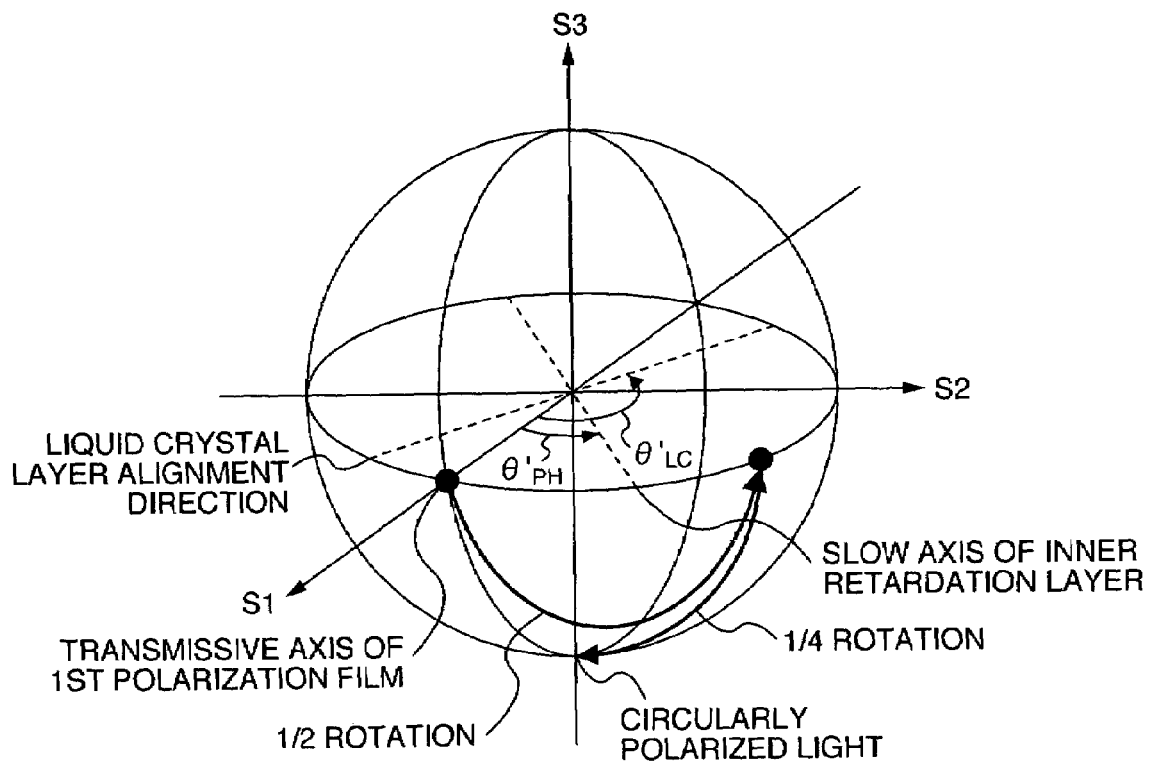
Figure 8B:
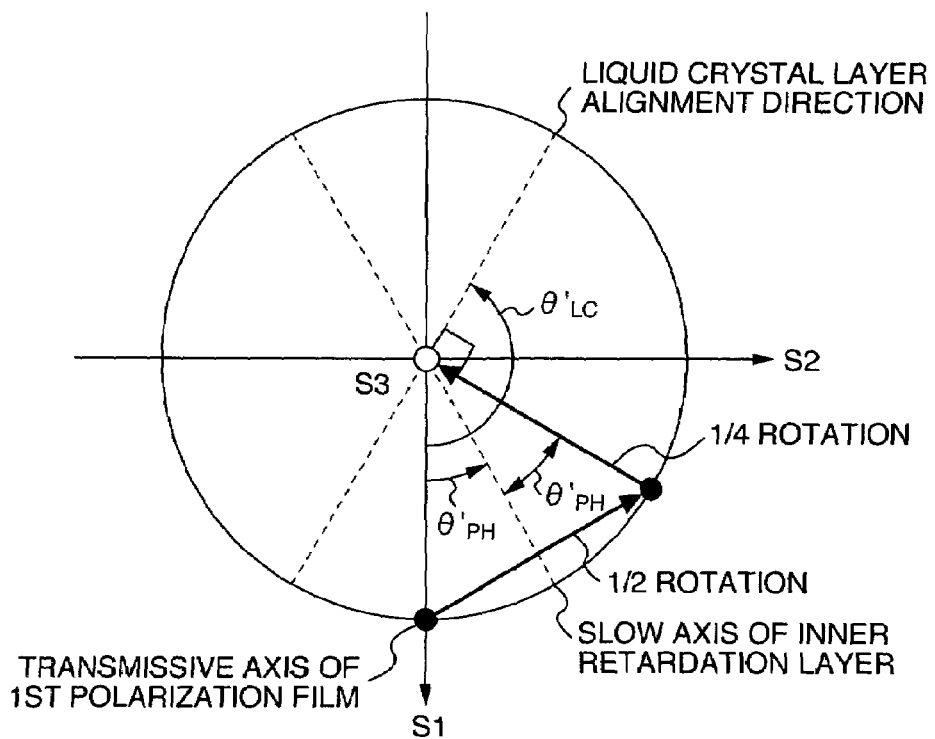

Although the incident light of each wavelength is concentrated on the North Pole NP on the Poincare' sphere in FIG. 8A, a similar effect can be obtained even if they are concentrated on South Pole SP on the Poincare' sphere as shown in FIG. 9. The Poincare' sphere when seen from the S3-axis direction is shown in FIG. 8B. In this case, the relation between $\theta'_{PH}$ and $\theta'_{LC}$ is expressed by the following expression (6).

$$2\theta'_{PH}=-90°+\theta'_{LC} \tag{6}$$

Figure 8C:
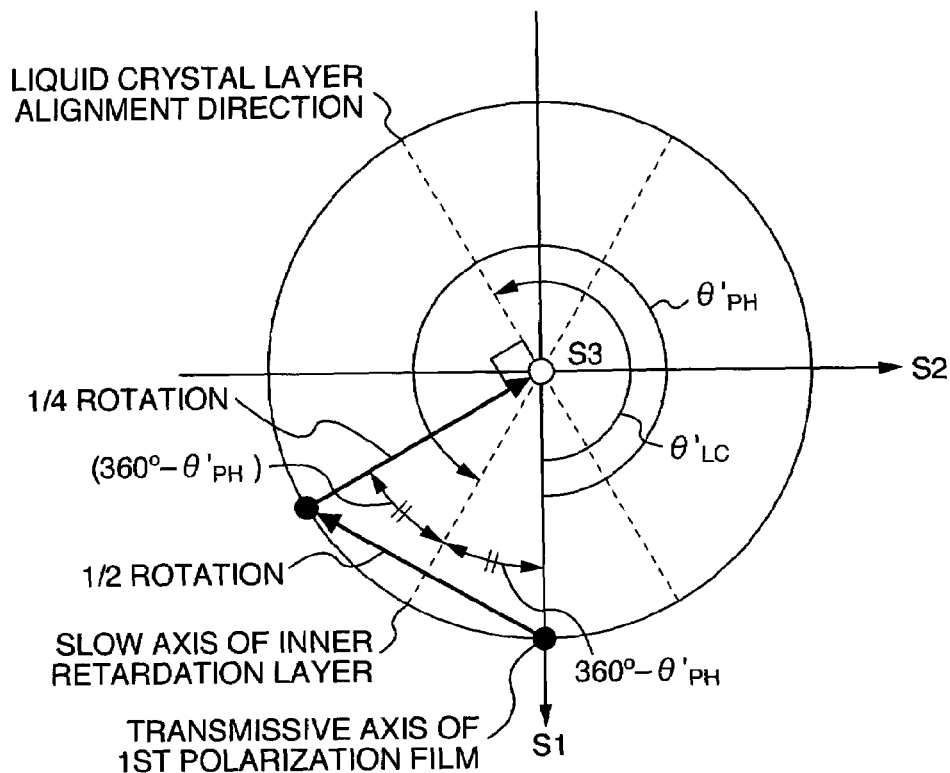
Figure 8D:
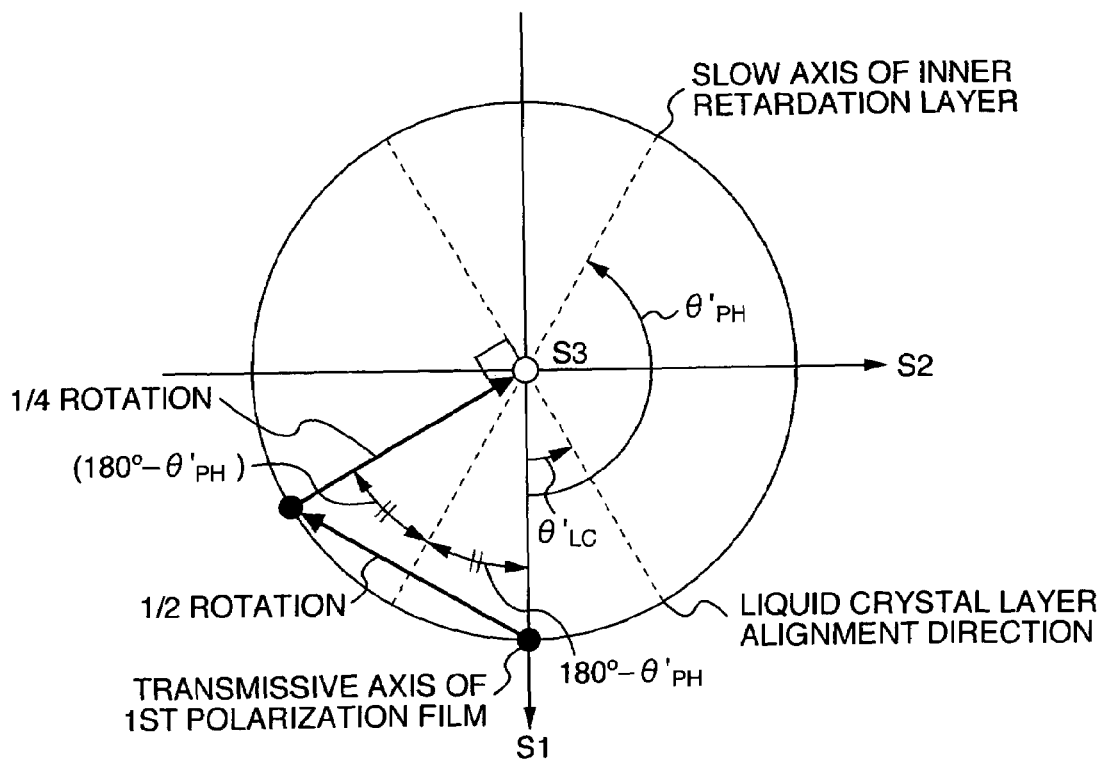

Further, as another method of concentrating the incident light of each wavelength on the North Pole NP or the South Pole SP, there is a method shown in FIG. 8C or 8D. In FIGS. 8C and 8D, the relation between $\theta'_{PH}$ and $\theta'_{LC}$ is expressed by the expressions (5) and (6), respectively. That is, in FIG. 8C, since $360°-\theta_{LC}$ is equal to $(360°-\theta'_{PH})\times 2+90°$, $2\theta'_{PH}=360°+90°+\theta'_{LC}$ and it is expressed by the expression (5). In FIG. 8D, since $180°-\theta'_{LC}$ is equal to $(180°-\theta'_{PH})\times 2+90°$, $2\theta'_{PH}=360°-90°+\theta'_{LC}$ and it is expressed by the expression (6).

The rotation axis on the Poincare' sphere corresponds to the azimuths $\theta_{PH}$ and $\theta_{LC}$ of the slow axis and the azimuths of the rotation axis are two times ($\theta'_{PH}=2\theta_{PH}$, $\theta'_{LC}=2\theta_{LC}$) of the azimuths of the slow axis in a real space. By substituting them into the expressions (5) and (6), the expression (1) showing the relation between the slow axis azimuths of the inner retardation layer and the liquid crystal layer is obtained.

According to the invention, to equalize the viewing angle performance of the transmissive display to that of the tansmissive IPS, the layout of the polarization films in the transmissive display unit is set to be similar to that of the tansmissive IPS system. For this purpose, $\theta_{LC}=90°$. By substituting it into the expression (1) and selecting a minus sign, $\theta_{PH}=22.5°$ and the slow axis azimuth of the inner retardation layer is obtained.

The transflective liquid crystal display manufactured as mentioned above is connected to a driving apparatus, a backlight is arranged on the rear side of display, and the display state is observed. When observing the display state in the light place in the state where the backlight has been lit off, a display image according to the reflective display can be confirmed. Subsequently, when observing the display state in the dark place in the state where the backlight has been lit on, a display image according to the transmissive display can be confirmed. Even if the observing direction from the normal of the substrate is changed in a wide range, gradation inversion does not occur and a reduction in contrast ratio is small.

[Comparison 1]

Figure 10:
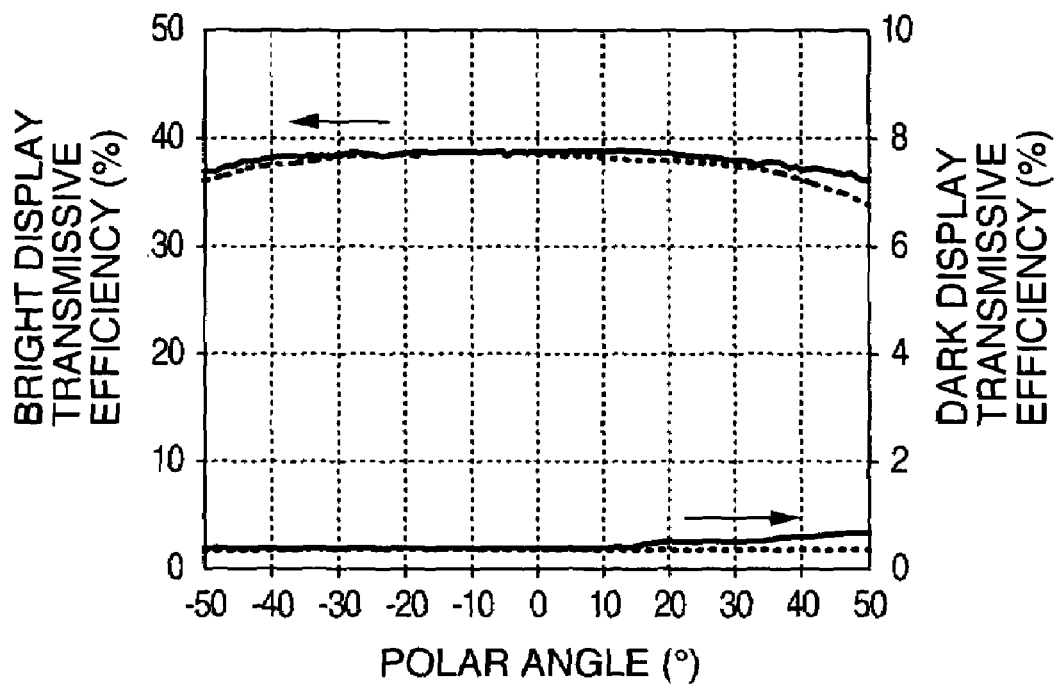
FIG. 10 is a graph showing viewing angle performance of a dark display transmissive ratio of the liquid crystal display of the embodiment 1.
Figure 24:
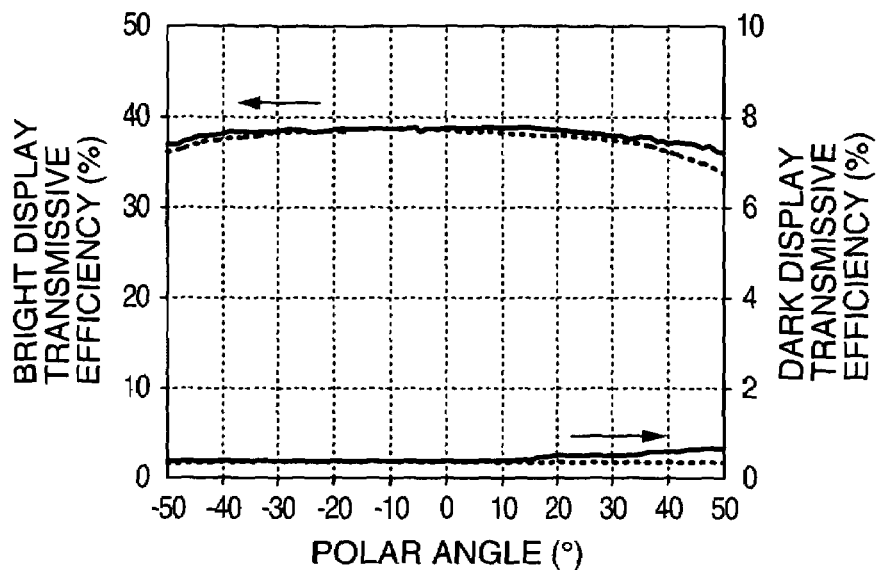
FIG. 24 is a graph showing viewing angle performance of a dark display transmissive ratio of the transmissive IPS liquid crystal display.

The viewing angle performance of the transmissive ratio in the dark display is evaluated. FIG. 10 shows polar angle dependency of the dark display transmissive ratio. Values measured at different azimuths are also shown. The dark display transmissive ratio decreases sufficiently at any azimuth. For comparison, polar angle dependency of the dark display transmissive ratio of the transmissive IPS is shown in FIG. 24. As will be obviously understood by comparing FIGS. 10 and 24, according to the transflective liquid crystal display of the embodiment, transmissive display performance similar to that of the transmissive IPS is obtained.

[Comparison 2]

Figure 25:
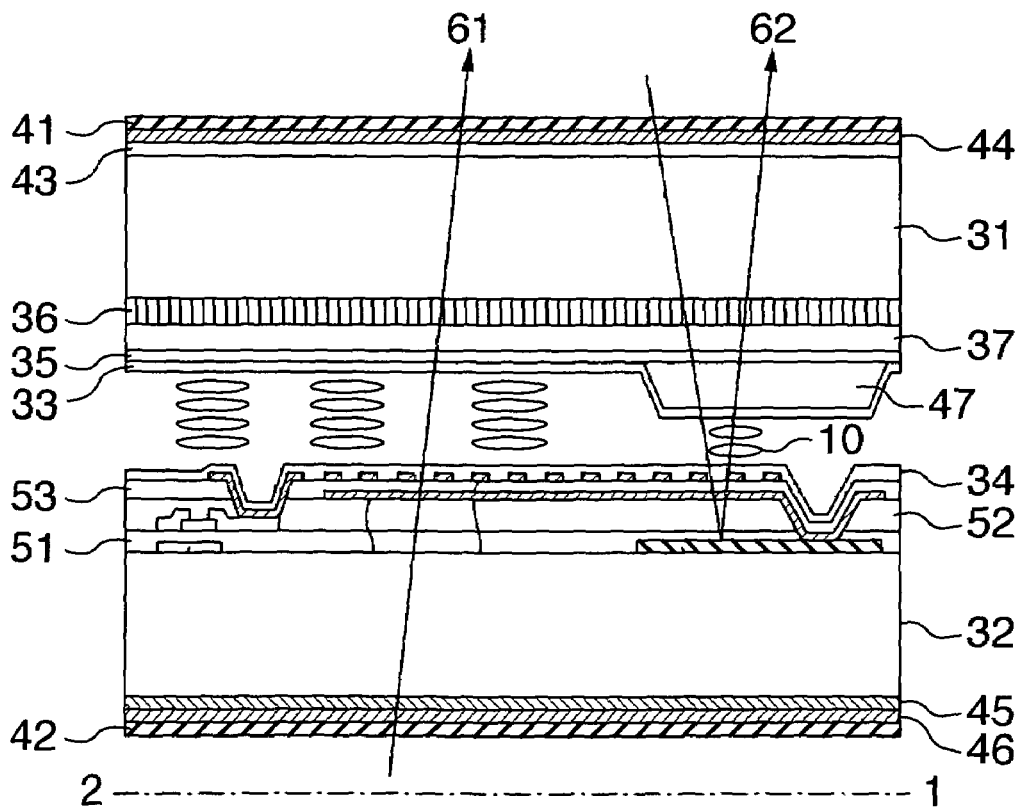
FIG. 25 is a diagram showing a cross section of one pixel of a conventional liquid crystal display.

The conventional transflective liquid crystal display in which the retardation films are arranged on the whole outside surfaces of the first and second substrates without using the inner retardation layer is manufactured. Its cross section is shown in FIG. 25. A step forming layer 47 having the same thickness as that of the inner retardation layer and having no retardation is arranged in place of the inner retardation layer. A first outside retardation film 44 of the same retardation and slow axis direction as those of the inner retardation layer is arranged between the first substrate 31 and the first polarization film 41. A second outside retardation film 45 and a third outside retardation film 46 are arranged between the second substrate 32 and the second polarization film 42 in order near the second substrate 32.

A retardation of the second outside retardation film 45 is equal to that of the liquid crystal layer and its slow axis direction perpendicularly crosses the alignment direction of the liquid crystal layer 10. A retardation of the third outside retardation film 46 is equal to that of the first outside retardation film 44 and its slow axis direction perpendicularly crosses the first outside retardation film 44.

As each of the first outside retardation film 44, the second outside retardation film 45, and the third outside retardation film 46, a film made of a cycloolefin organic polymer in which the wavelength dependency of the retardation is relatively small is used. A construction of the reflective display unit is similar to that of the transflective liquid crystal display of the invention except for a point that the first outside retardation film 44 is used in place of the inner retardation layer.

A construction of the transmissive display unit extremely differs from that of the transflective liquid crystal display of the invention. This is because the first outside retardation film 44 is also distributed to the transmissive display unit. Thus, in the normal direction, the third outside retardation film 46 which compensates the phase difference of the first outside retardation film 44 is necessary. Further, the second outside retardation film 45 which compensates the phase difference of the liquid crystal layer 10 is necessary.

Figure 26:
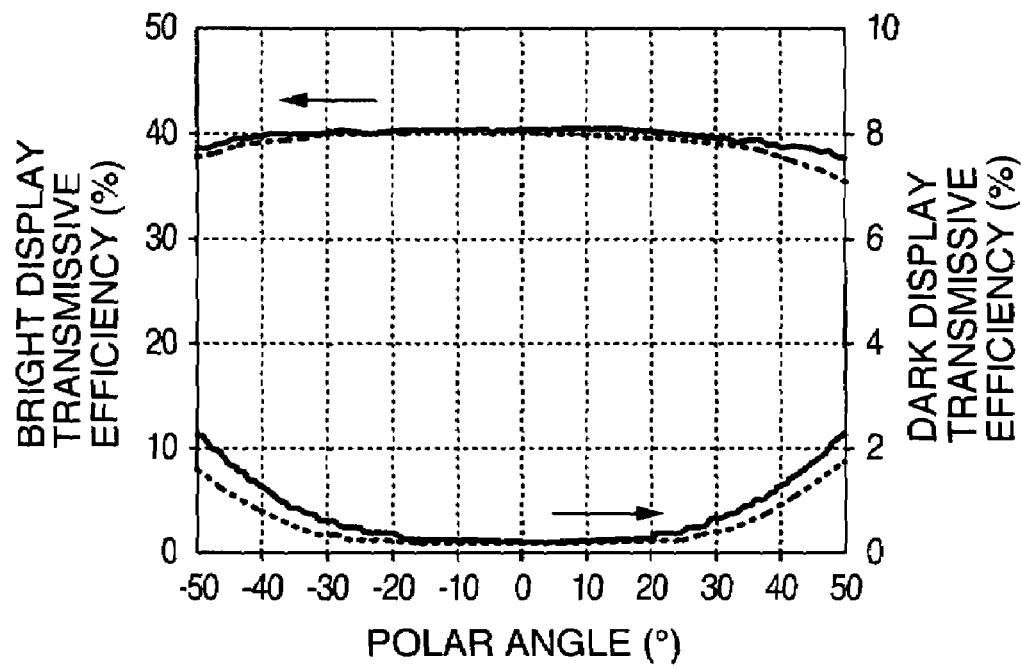
FIG. 26 is a graph showing viewing angle performance of a dark display transmissive ratio of the conventional liquid crystal display.

Results of evaluation of the viewing angle performance of the dark display transmissive ratio of the conventional transflective liquid crystal display are shown in FIG. 26. FIG. 26 shows that the dark display transmissive ratio rapidly increases with an increase in polar angle in dependence on the azimuth and the contrast ratio decreases in dependence on the oblique direction. As will be obviously understood in comparison with FIG. 10 that the viewing angle performance is extremely inferior to that of the transflective liquid crystal display of the invention. This is because the first outside retardation film 44, the second outside retardation film 45, and the third outside retardation film 46 are arranged in the transmissive display unit, and even if the azimuths of the slow axis and the retardation are determined so as to compensate the phase difference of those laminates in the normal direction, the phase difference is not compensated in dependence on the oblique direction.

By forming the retardation films only in the portion corresponding to the reflective display unit and allowing the retardation films to be included in the liquid crystal cell as mentioned above, both the reflective display in the light place and the transmissive display of the wide viewing angle similar to that of the transmissive liquid crystal display can be realized.

[Comparison 3]

Attention is paid to the liquid crystal layer thickness dependency of the dark display transmissive ratio and the liquid crystal display of the invention is compared with the conventional transflective liquid crystal display in which the retardation films are arranged on the whole outside surfaces of the first and second substrates. In the case of the conventional transflective liquid crystal display, since the light entering the liquid crystal layer is the elliptically polarized light, the phase difference is applied by the liquid crystal layer and, if the phase difference changes in association with a fluctuation in liquid crystal layer thickness, the dark display transmissive ratio fluctuates largely.

Figure 27:
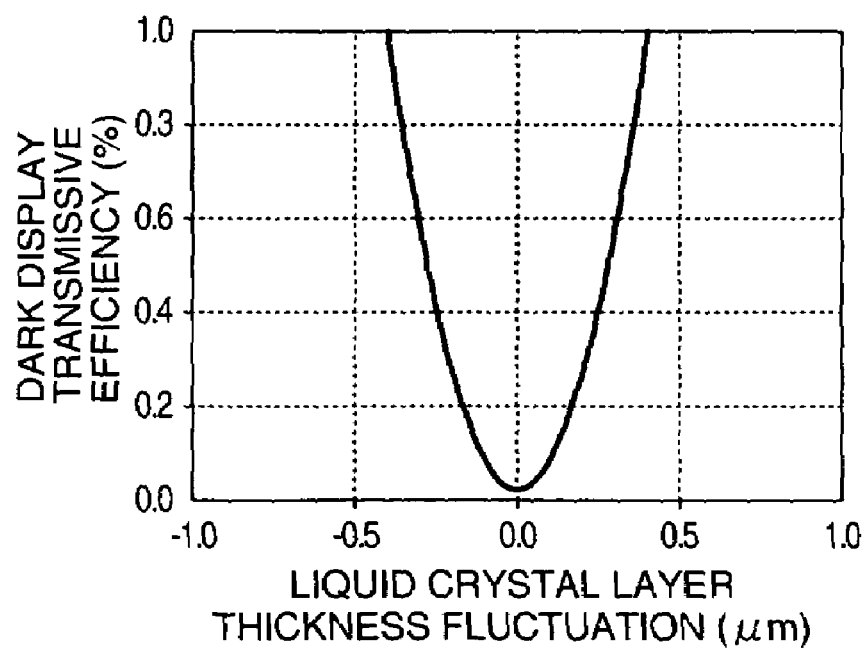
FIG. 27 is a graph showing liquid crystal layer thickness dependency of the dark display transmissive ratio of the conventional liquid crystal display.

The liquid crystal layer thickness dependency of the dark display transmissive ratio is shown in FIG. 27. In the conventional transflective liquid crystal display, if the liquid crystal layer thickness is deviated from a design value, the dark display transmissive ratio easily increases and the contrast ratio decreases. For example, there is a case where the liquid crystal layer thickness fluctuates in the display screen. In such a case, the contrast ratio is not constant in the display screen but is observed as a variation in dark display and an unwell feeling is applied to the user.

Figure 11:
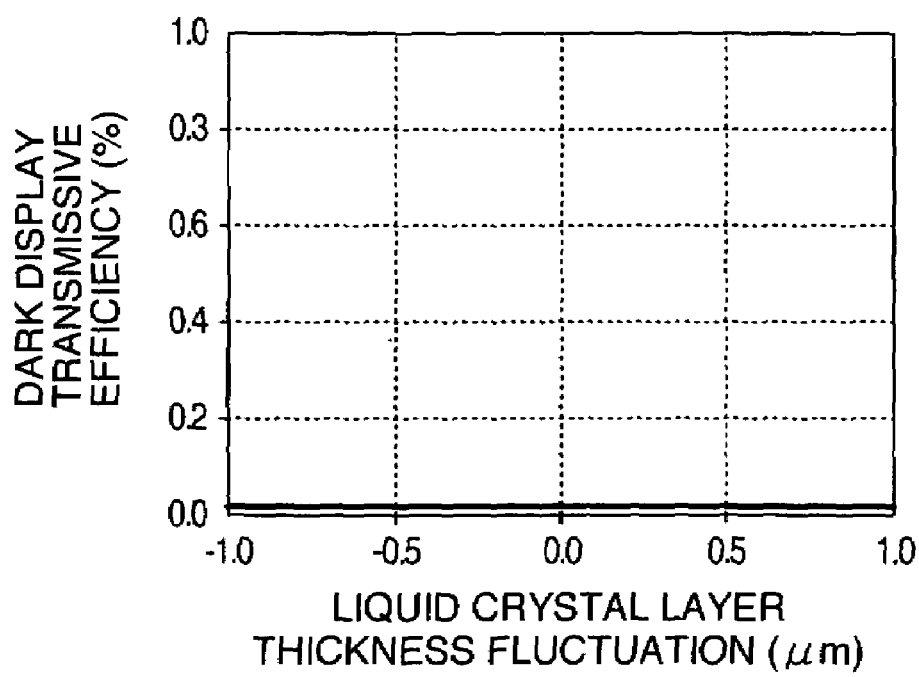
FIG. 11 is a graph showing liquid crystal layer thickness dependency of the dark display transmissive ratio of the liquid crystal display of the embodiment 1.

On the other hand, in the case of the invention, in the transmissive display unit, since the light entering the liquid crystal layer is the linearly polarized light and its electric vector is parallel with the alignment direction of the liquid crystal layer. Since only either the normal light beam or the abnormal light beam occurs in the liquid crystal layer, the phase difference cannot be applied by the liquid crystal layer. Therefore, as shown in FIG. 11, even if the liquid crystal layer thickness fluctuates, the dark display transmissive ratio hardly fluctuates. There is such a feature that the contrast ratio is difficult to decrease and even if the liquid crystal layer thickness fluctuates in the display screen, a variation in dark display is difficult to occur. As mentioned above, according to the liquid crystal display of the invention, in addition to the transmissive display of the wide viewing angle, the uniform display without a variation in dark display can be obtained.

[Comparison 4]

In the case of applying the liquid crystal display to a cellular phone or the like, a thin size and a light weight are required. Attention is paid to the thickness of liquid crystal panel and the liquid crystal display of the invention is compared with the conventional transflective liquid crystal display in which the retardation films are arranged on the whole outside surfaces of the first and second substrates. The liquid crystal panel indicates a portion sandwiched between the first polarization film and the second polarization film.

A thickness of each of the first and second substrates is equal to 0.5 mm, a thickness of each of the first and second polarization films is equal to 0.12 mm, and a thickness of each of the first, second, and third retardation films is equal to 0.05 mm. The thickness of liquid crystal panel is substantially determined by those component elements. Since a thickness of each of the color filter, inner retardation layer, and the like formed on the first substrate and a thickness of each of the thin film transistors, various lines, insulation films, and the like formed on the second substrate are equal to a few μm, they hardly exert an influence on the thickness of liquid crystal panel.

Since the conventional transflective liquid crystal display has the first, second, and third retardation films in addition to the first and second substrates and the first and second polarization films, the thickness of liquid crystal panel is equal to 1.39 mm. On the other hand, since it does not have the first, second, and third retardation films, the liquid crystal display of the invention is characterized in that the thickness of liquid crystal panel is equal to 1.24 mm and thin.

[Embodiment 2]

Figure 12:
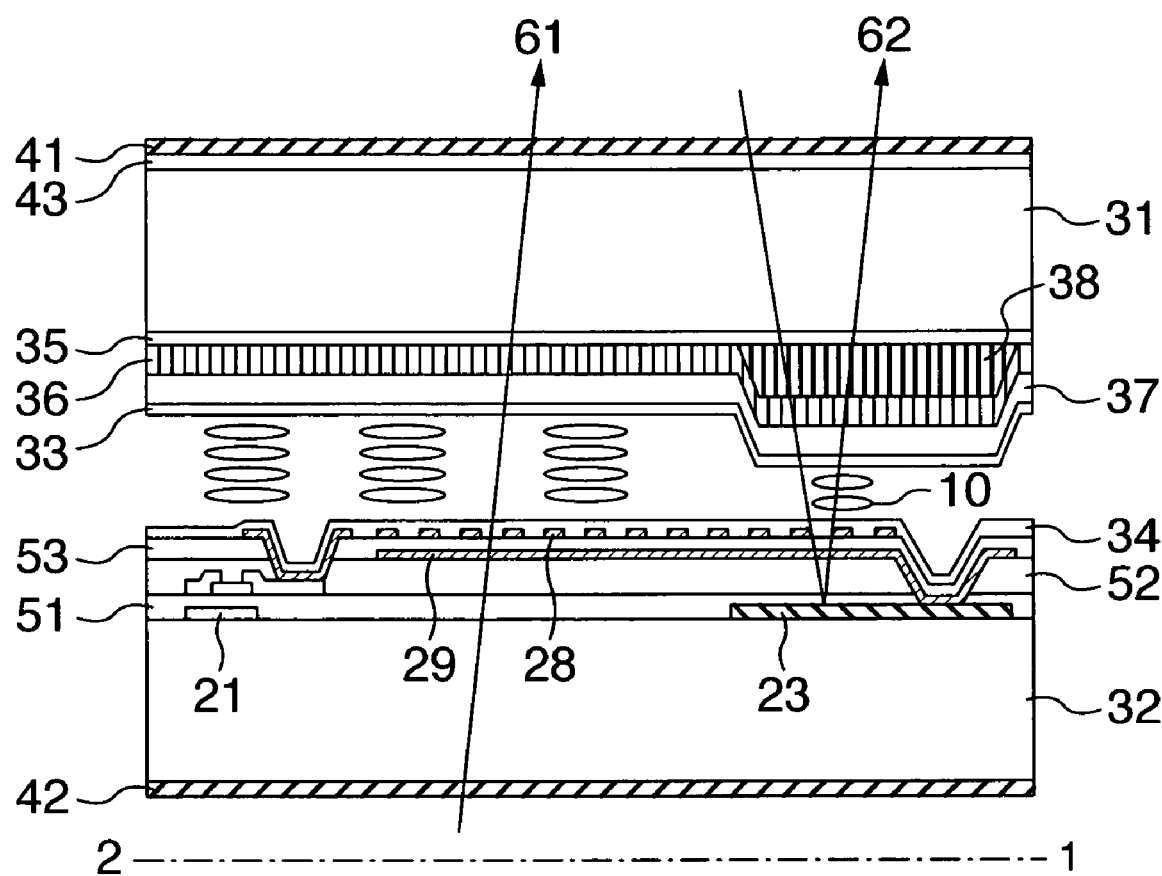
FIG. 12 is a diagram showing a cross section of one pixel of a liquid crystal display of the embodiment 2.

A cross sectional view of the liquid crystal display of the embodiment is shown in FIG. 12. In the embodiment, in the construction of the liquid crystal display of the embodiment 1, the inner retardation layer 38 is formed between the third alignment layer 35 and the color filter 36. Thus, the color filter 36, the leveling layer 37, and the first alignment layer 33 exist between the inner retardation layer 38 and the liquid crystal layer 10. There is a case where the non-reacted photoreactive liquid crystal and the initiator remain in the inner retardation layer 38. If they are mixed into the liquid crystal layer 10, there is a case where performance such as a holding ratio or the like deteriorates. If a number of films exist between the inner retardation layer 38 and the liquid crystal layer 10 as in the embodiment, since those films have a function of preventing the non-reactant and the initiator from being mixed into the liquid crystal layer 10, the performance deterioration can be prevented.

In this case, after the inner retardation layer 38 is formed, the color filter 36 is manufactured. At this time, although it is necessary to position the inner retardation layer 38 and the color filter 36, since the inner retardation layer 38 itself is transparent, it cannot be used as an index for the positioning. If a positioning index is preliminarily formed in an opaque layer before manufacturing the inner retardation layer 38, and the inner retardation layer 38 and the color filter 36 are patterned by using such an index as a reference, the inner retardation layer 38 and the color filter 36 can be positioned.

[Embodiment 3]

Figure 13:
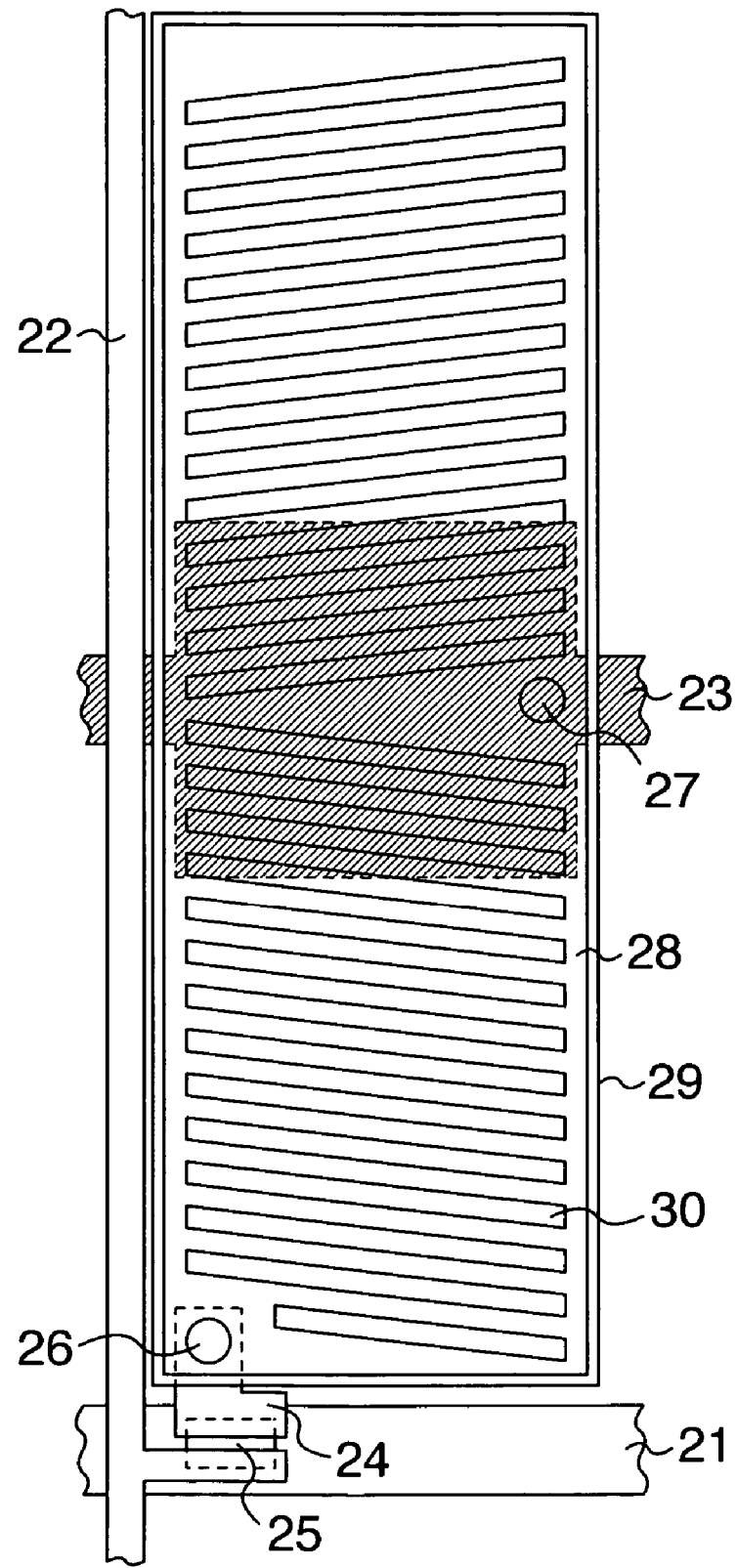
FIG. 13 is a diagram showing various lines and electrode distribution in one pixel on a second substrate of a liquid crystal display according to the embodiment 3.
Figure 14:
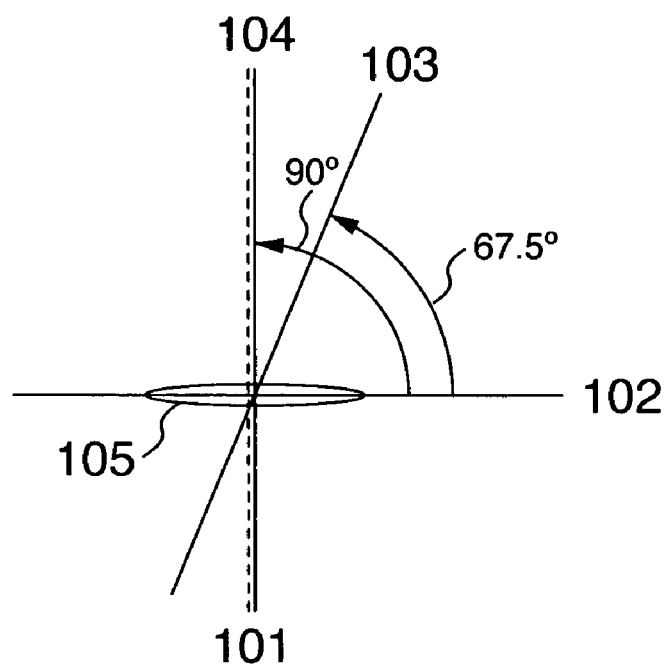
FIG. 14 is a diagram showing a layout of axes in a reflective display unit of the liquid crystal display of the embodiment 3.
Figure 15:
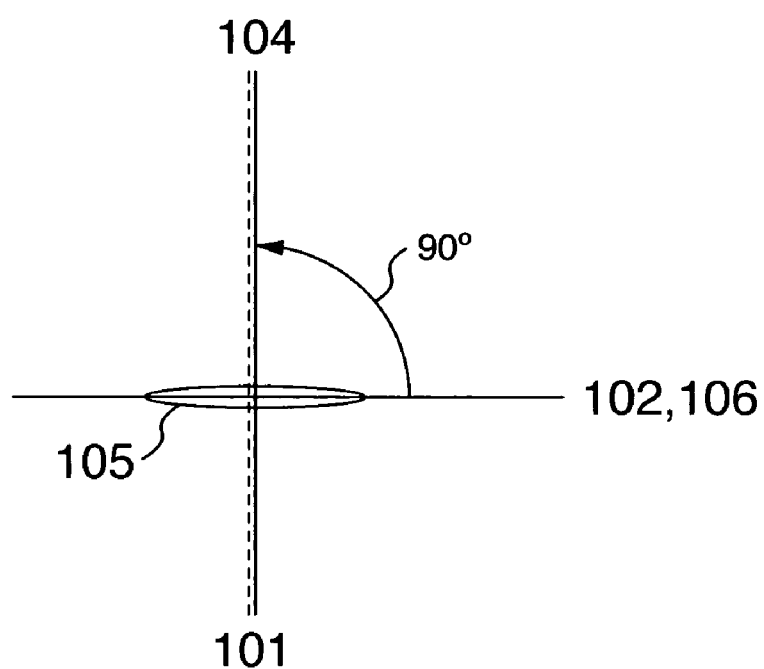
FIG. 15 is a diagram showing a layout of axes in a transmissive display unit of the liquid crystal display of the embodiment 3.

In the embodiment, the inclining direction of the slits 30 of the pixel electrode 28 is set to two kinds. A plan view of one pixel of the transflective liquid crystal display of the embodiment is shown in FIG. 13. In the upper half portion and the lower half portion of the pixel, the slits 30 are inclined by −75° and 75° from the signal line 22, respectively. In association with it, as shown in FIGS. 14 and 15, the liquid crystal alignment direction 102, the slow axis direction 103 of the inner retardation layer 38, the transmissive axis 104 of the first polarization film 41, and the transmissive axis 106 of the second polarization film 42 are changed.

The liquid crystal alignment direction 102 is set to be perpendicular to the signal line direction 101. An angle between the liquid crystal alignment direction 102 and the electric field direction in the upper half portion of the pixel and that in the lower half portion are set to the same angle of 75°. The slow axis direction 103 of the inner retardation layer, the transmissive axis 104 of the first polarization film, and the transmissive axis 106 of the second polarization film are set so as to be rotated by 15° clockwise with respect to the disclosure of FIGS. 4 and 5 in such a manner that the relative angle relation with respect to the liquid crystal alignment direction 102 is equalized to that of the embodiment 1.

The common line 23 is arranged so as to transverse the pixel in the center portion. Thus, the portion where the slits 30 are inclined by −75° from the signal line 22 and the portion where they are inclined by 75° from the signal line 22 are distributed so as to have the same area in both the reflective display unit and the transmissive display unit.

In the liquid crystal layer of the center portion of the pixel electrode 28 where the inclining direction of the slits 30 changes, even if the voltage is applied, the liquid crystal alignment does not change. Since this center portion always has the same liquid crystal alignment as that of the dark display, it is observed as a dark line and the reflective ratio or transmissive ratio of one pixel decreases. However, since the slits 30 are arranged so that their inclining direction changes with respect to the upper half portion and the lower half portion of the pixel, the dark line portion is distributed in the shorter side direction, thereby minimizing the decrease in the reflective ratio or the transmissive ratio.

By setting the inclining direction of the slits to the two kinds as mentioned above, the liquid crystal layer alignment direction when the voltage is applied is set to the two directions. In the whole one pixel, the azimuth dependency of the viewing angle performance in the right half portion and that in the left half portion are set off, so that an effect of further improving the viewing angle performance can be obtained.

[Embodiment 4]

Figure 16:
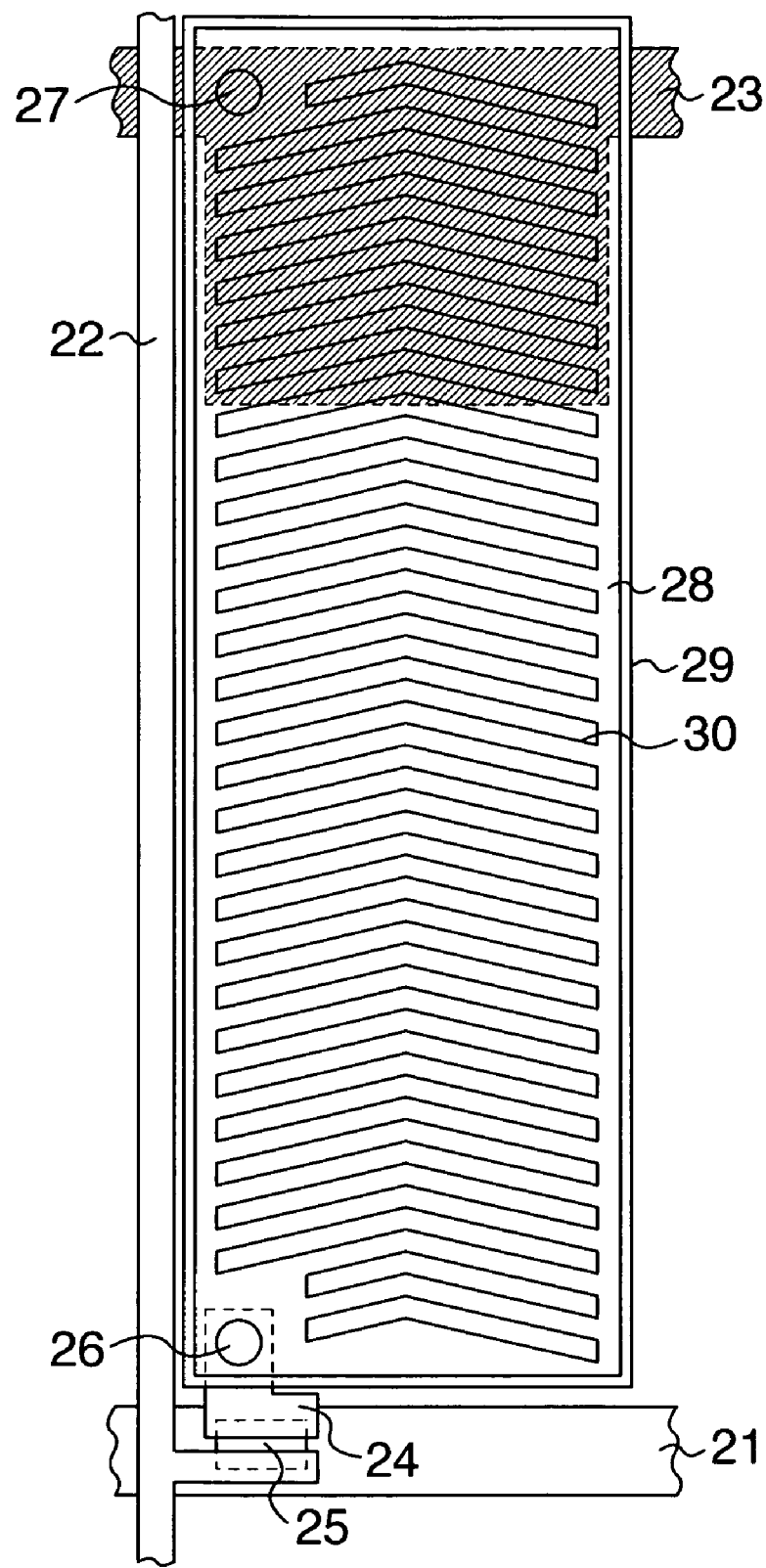
FIG. 16 is a diagram showing various lines and electrode distribution in one pixel on a second substrate of a liquid crystal display according to the embodiment 4.

In the embodiment, as shown in FIG. 16, each slit 30 is set into a V-character shape and the director distribution of the liquid crystal layer when the voltage is applied is set to the two directions. The liquid crystal alignment direction, the slow axis direction of the inner retardation layer, and the transmissive axis of the first polarization film, and the transmissive axis of the second polarization film are set to those similar to the embodiment 3. In this case, in a manner similar to the embodiment 1, even if the scanning line 21 and the signal line 22 are closely arranged, the portion where the slits 30 are inclined by −75° from the signal line 22 and the portion where they are inclined by 75° from the signal line 22 can be distributed so as to have the same area in both the reflective display unit and the transmissive display unit. Also in this case, the effect of improving the viewing angle performance can be obtained. However, since the dark line appears in parallel with the long side of the pixel, it is relatively long and the decrease in the reflective ratio or the transmissive ratio is relatively large.

The third alignment layer 35 has a function to decide the slow axis azimuth of the inner retardation layer 38. In the invention, a light alignment layer to decide the alignment direction by the light irradiation is used as a third alignment layer 35. As a light alignment layer, there is a layer using a photo dimerization reaction of a cinnamic acid or coumarin or a layer using a photo cleavage reaction of a polymer. The light alignment layer is not spread as compared with the alignment layer according to the conventional rubbing method. As one of the causes, a cause in which a tilt angle which is applied to the liquid crystal layer is small and the alignment change of the liquid crystal layer when the voltage is applied is unstable can be mentioned. Since the inner retardation layer does not need the tilt angle, fundamentally, any kind of light alignment layer can be applied to the third alignment layer 35. In this case, the number of times of the rubbing process which is executed to the first substrate 31 can be set to one time.

[Embodiment 5]

Figure 17:
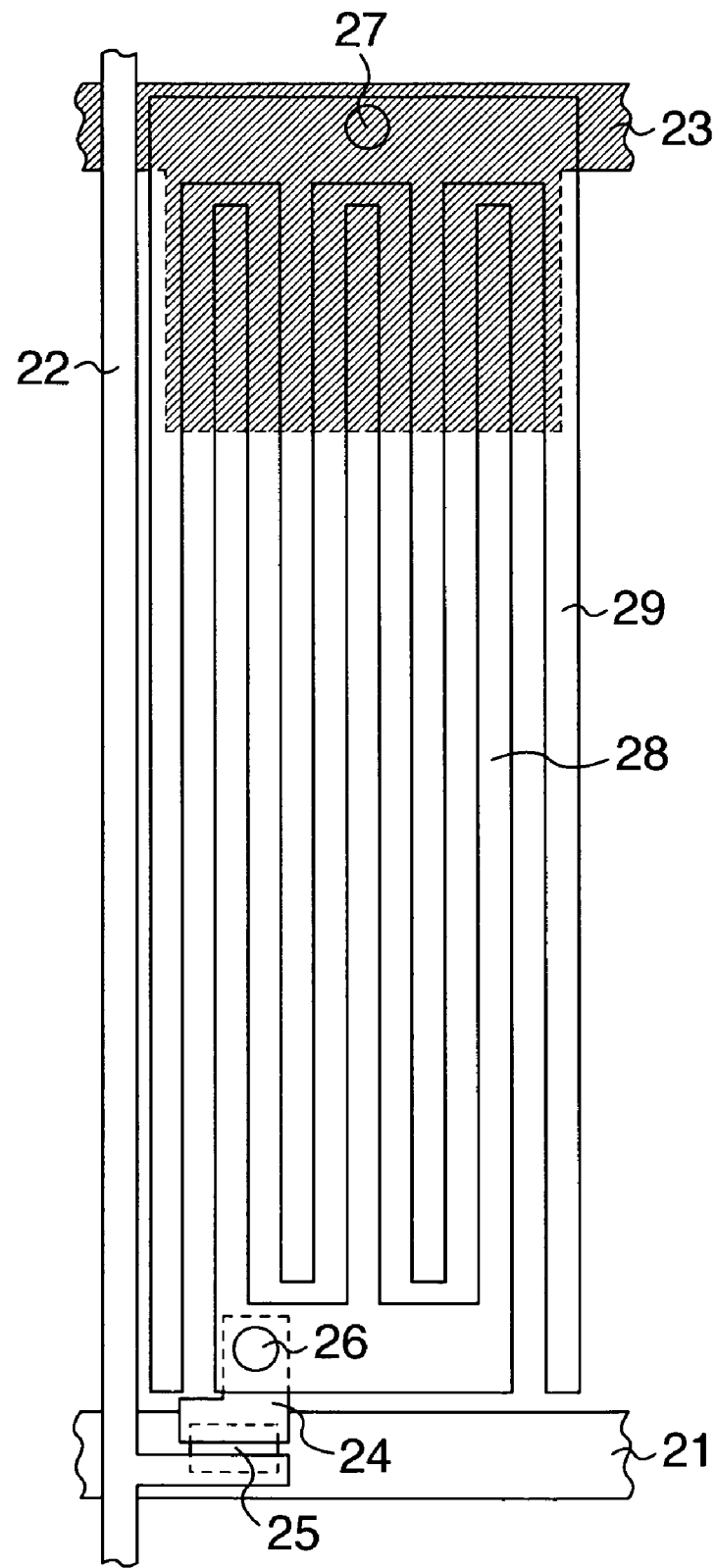
FIG. 17 is a diagram showing various lines and electrode distribution in one pixel on a second substrate of a liquid crystal display according to the embodiment 5.

A plan view of a liquid crystal display of the embodiment is shown in FIG. 17. In the embodiment, both the pixel electrode 28 and the common electrode 29 are set into a comb-toothed shape and formed in the same layer. Thus, when the voltage is applied, an arch-shaped electric field is formed between the pixel electrode 28 and the common electrode 29 and the liquid crystal layer is driven.

Since the comb-toothed structure of the pixel electrode 28 and the common electrode 29 is parallel with the signal line 22, the electric field direction is perpendicular to the signal line 22. In association with it, as shown in FIGS. 18 and 19, the slow axis direction 103 of the inner retardation layer 38, the transmissive axis direction 104 of the first polarization film 41, and the transmissive axis direction 106 of the second polarization film 42 are changed.

Figure 18:
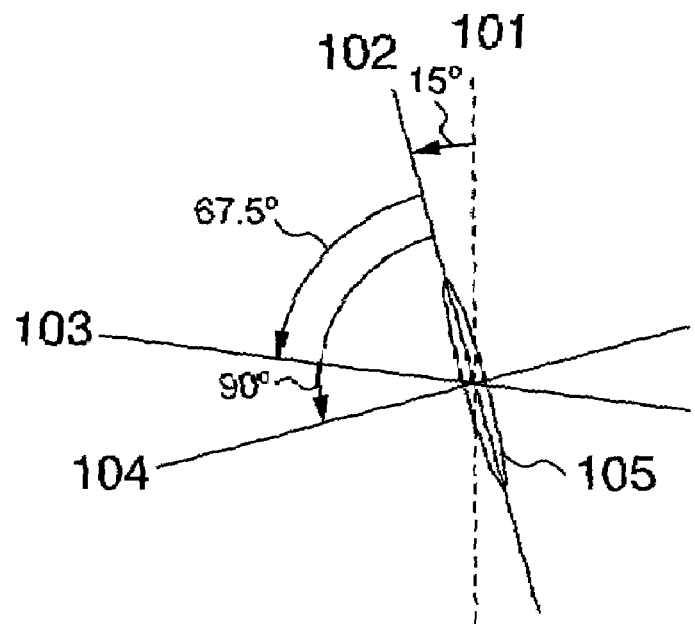
FIG. 18 is a diagram showing a layout of axes in a reflective display unit of the liquid crystal display of the embodiment 5.
Figure 19:
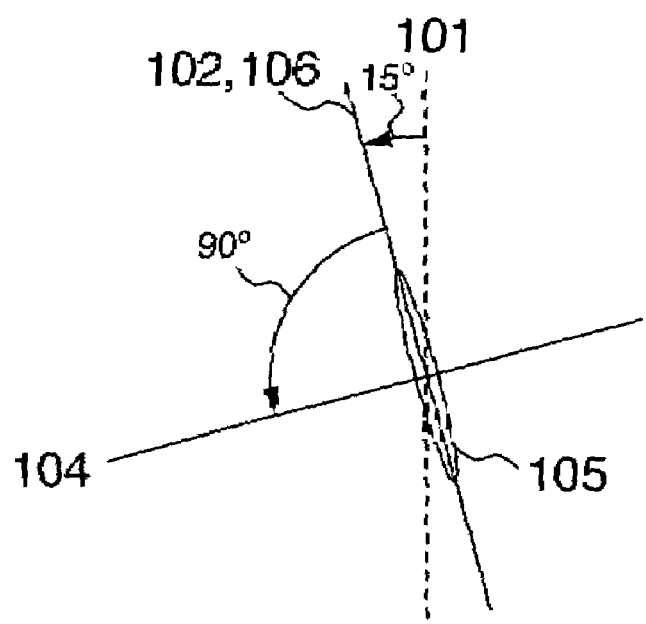
FIG. 19 is a diagram showing a layout of axes in a transmissive display unit of the liquid crystal display of the embodiment 5.

FIGS. 18 and 19 show the reflective display unit and transmissive display unit, respectively. The liquid crystal alignment direction 102 is set to 15° from the azimuth 101 of the signal line 22 so as to be set to 75° from the electric field direction. This setting corresponds to that the layout is rotated counterclockwise by 90° from the layout of the embodiment 1.

The slow axis direction 103 of the inner retardation layer, the transmissive axis 104 of the first polarization film, and the transmissive axis 106 of the second polarization film are set so as to be rotated counterclockwise by 90° from those shown in FIGS. 4 and 3 in such a manner that the relative angle relation for the liquid crystal alignment direction 102 is substantially the same as that in the embodiment 1.

Also in the case of the embodiment, both the reflective display at a light place and the transmissive display of the wide viewing angle similar to that of the transmissive liquid crystal display can be realized. Since the pixel electrode 28 and the common electrode 29 are formed in the same layer, the manufacturing steps can be simplified.

[Embodiment 6]

Figure 20:
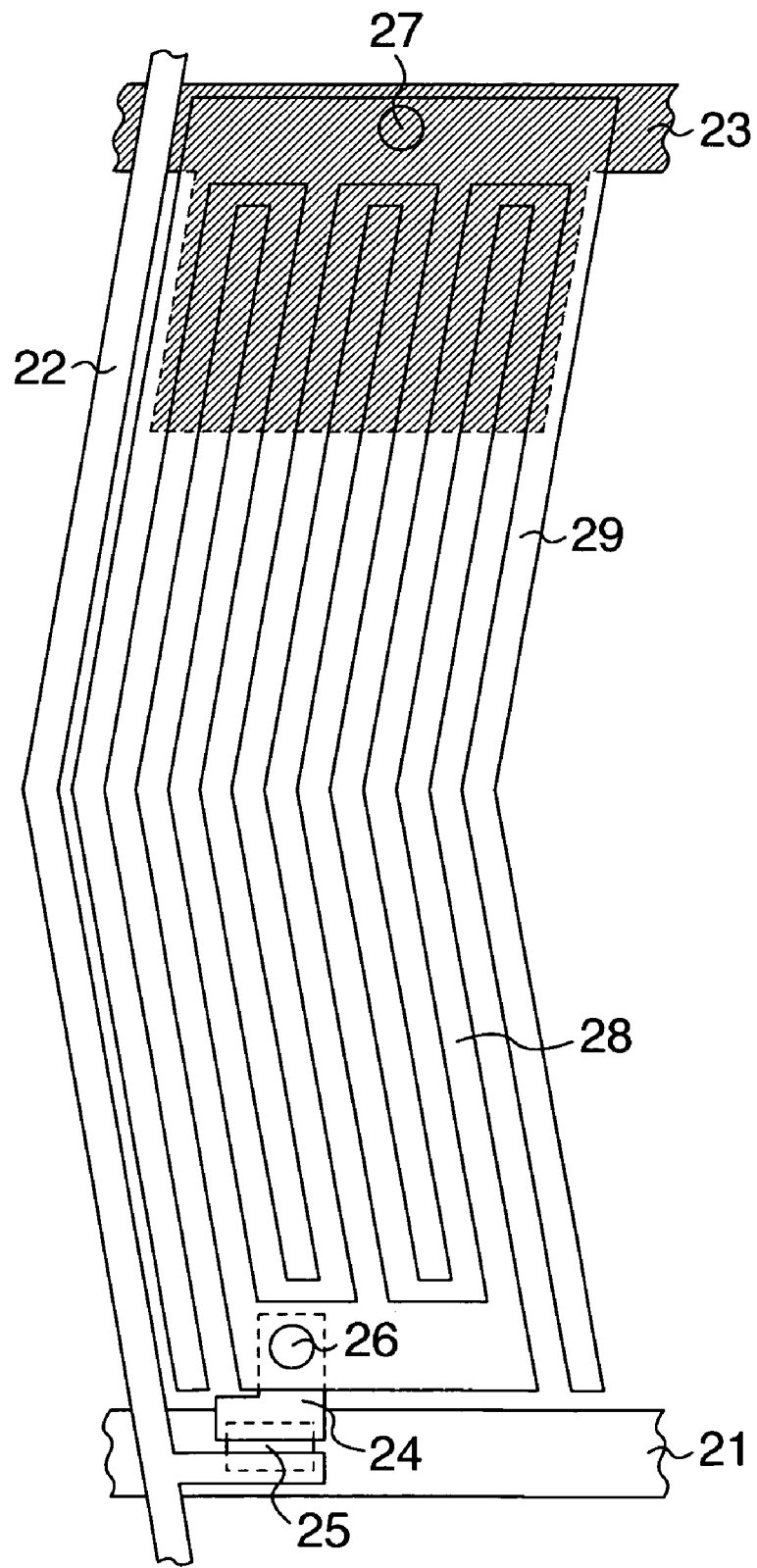
FIG. 20 is a diagram showing various lines and electrode distribution in one pixel on a second substrate of a liquid crystal display according to the embodiment 6.

A plan view of a liquid crystal display of the embodiment is shown in FIG. 20. In the embodiment, the pixel electrode 28 and the common electrode 29 are formed in the same layer in a manner similar to the embodiment 5. Further the comb-toothed structure is set into a V-character shape. Thus, the direction of the electric field which is formed between the pixel electrode 28 and the common electrode 29 when the voltage is applied is set to two directions. In association with it, as shown in FIGS. 21 and 22, the slow axis direction 103 of the inner retardation layer 38, the transmissive axis 104 of the first polarization film 41, and the transmissive axis 106 of the second polarization film 42 are changed.

Figure 21:
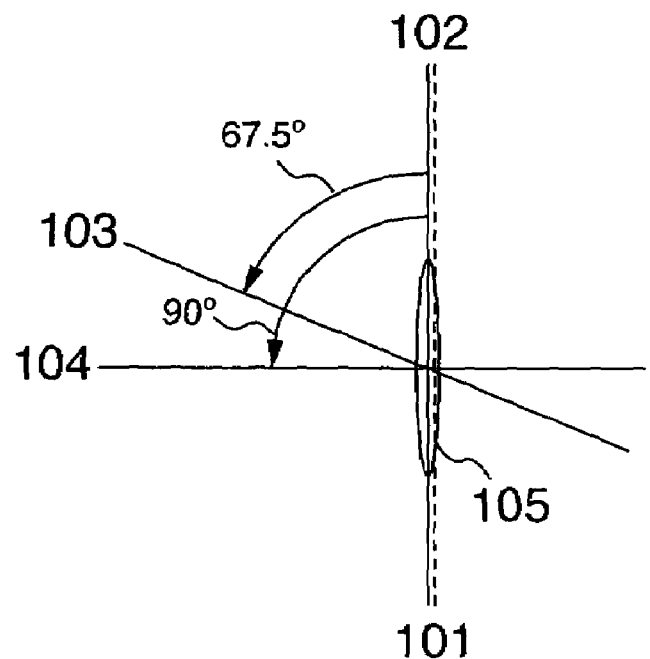
FIG. 21 is a diagram showing a layout of axes in a reflective display unit of the liquid crystal display of the embodiment 6.
Figure 22:
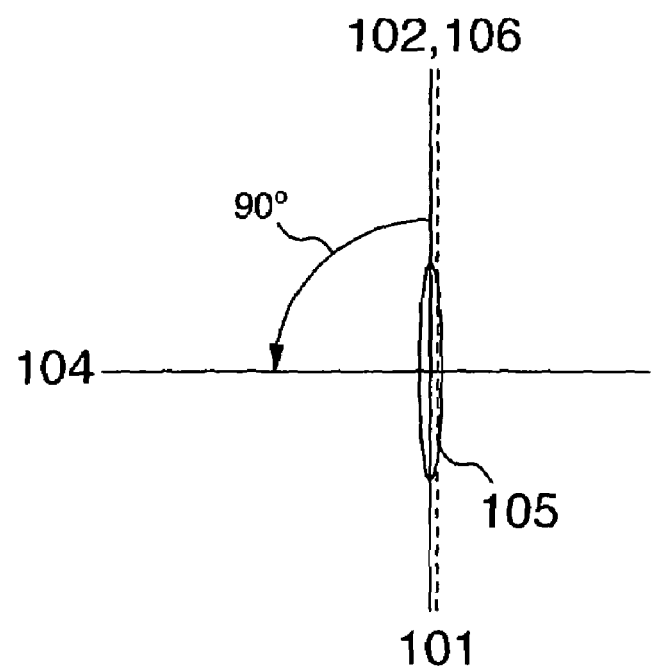
FIG. 22 is a diagram showing a layout of axes in a transmissive display unit of the liquid crystal display of the embodiment 6.

FIGS. 21 and 22 show the reflective display unit and transmissive display unit, respectively. The liquid crystal alignment direction 102 is set in parallel with the azimuth 101 of the signal line 22 so as to be set to 75° from the electric field direction. This setting corresponds to that the layout is rotated counterclockwise by 75° from the layout of the embodiment 1. The slow axis direction 103 of the inner retardation layer, the transmissive axis 104 of the first polarization film, and the transmissive axis 106 of the second polarization film are set so as to be rotated counterclockwise by 75° as compared with the layout shown in FIGS. 4 and 3 in such a manner that the relative angle relation for the liquid crystal alignment direction 102 is substantially the same as that in the embodiment 1.

By setting the comb-toothed structure into the V-character shape in the structure in which the pixel electrode 28 and the common electrode 29 are formed in the same layer and the manufacturing steps are simplified, the liquid crystal layer alignment direction when the voltage is applied is set to the two directions. In the whole one pixel, the azimuth dependency of the viewing angle performance in the right half portion and that in the left half portion are set off, so that the effect of further improving the viewing angle performance can be obtained.

[Embodiment 7]

Figure 23:
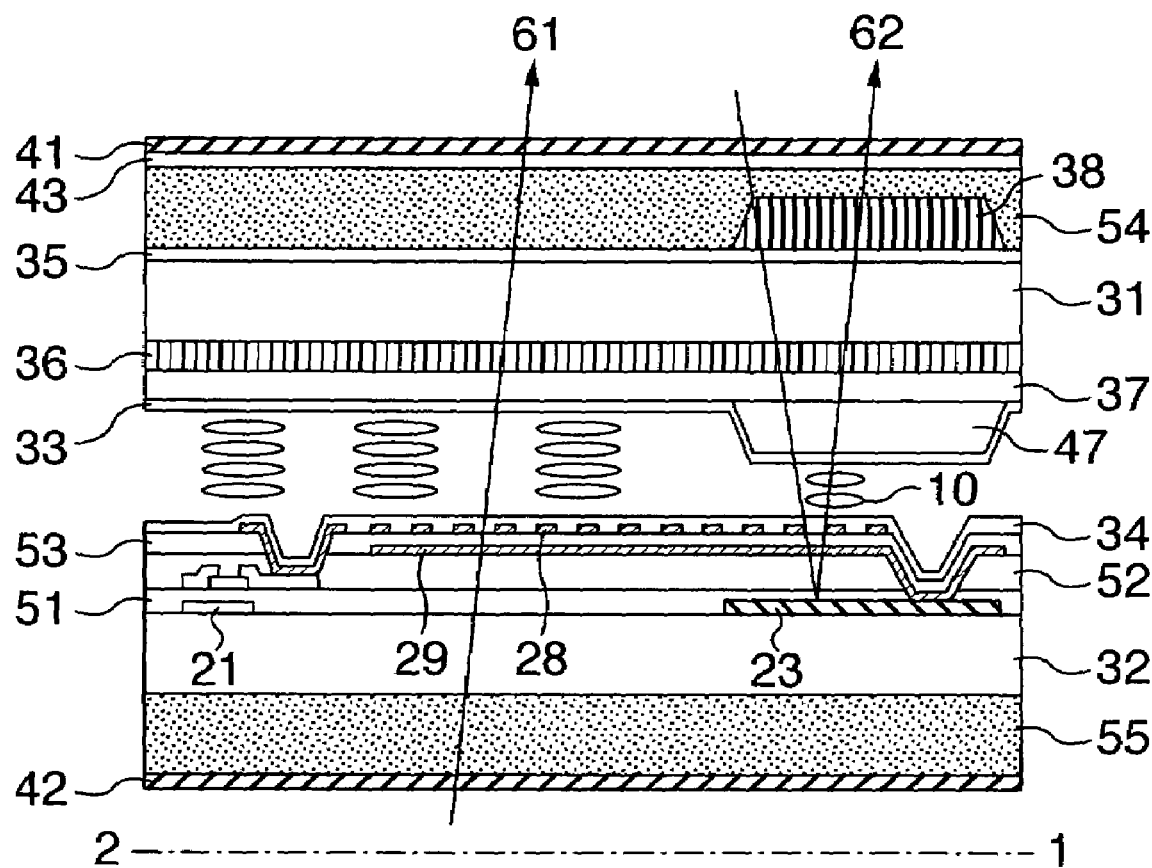
FIG. 23 is a diagram showing a cross section of one pixel of a liquid crystal display of the embodiment 7.

A cross sectional view of a liquid crystal display of the embodiment is shown in FIG. 23. In the embodiment, the step forming layer 47 having the same thickness as that of the inner retardation layer 38 and having no retardation is arranged in place of the inner retardation layer 38 in the construction of the embodiment 1. After the first substrate 31 and the second substrate 32 are combined and the liquid crystal layer 10 is formed, the thicknesses of those substrates are reduced to 30 μm, respectively. Although a mechanical polishing method has been used to reduce the thicknesses of the first substrate 31 and the second substrate 32, for example, another method of using corrosion by an acid such as a hydrofluoric acid or the like can be used.

Subsequently, the inner retardation layer 38 is formed at the position corresponding to the reflective display unit. After that, a first holding layer 54 is formed outside of the first substrate 31 and a second holding layer 55 is formed outside of the second substrate 32, respectively. Each of the first holding layer 54 and the second holding layer 55 is made of a transparent resin. Since their thicknesses are reduced, the first and second holding layers have a function of reinforcing the first substrate 31 and second substrate 32 in which a strength has been weakened.

In addition to such a function, the first holding layer 54 has a function of flattening the rough surface caused by the inner retardation layer 38. If isotropic media whose retardation is equal to zero are used for the first holding layer 54 and the second holding layer 55, since no influence is exercised on the polarizing state of the transmissive light, the transmissive display of the wide viewing angle can be obtained in a manner similar to the embodiment 1. Since the first holding layer 54 and the second holding layer 55 are made of the transparent resin and are lighter than the first substrate 31 and second substrate 32 made of glass, an effect of reducing a weight of the whole liquid crystal display can be obtained.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A liquid crystal display constructed by a first substrate, a second substrate, and a liquid crystal layer, said liquid crystal layer being sandwiched between said first substrate and said second substrate, said second substrate having a pixel electrode and a common electrode, an electric field substantially parallel with surfaces of said substrates being applied between said pixel electrode and said common electrode to drive said liquid crystal layer, a reflective display unit and a transmissive display unit being formed in one pixel, a first polarization film and a second polarization film being arranged outside of the first substrate and the second substrate, transmissive axes of said first polarization film and said second polarization film perpendicularly crossing each other, and either one of said transmissive axes of said first polarization film and said second polarization film being parallel with a liquid crystal alignment direction, wherein said display has a retardation film in a portion corresponding only to said reflective display unit, said retardation film is arranged between said first polarization film and said liquid crystal layer, a retardation of the liquid crystal layer of said reflective display unit is equal to a quarter wave, and a retardation of said retardation film is equal to a half wave.

2. A display according to claim 1, wherein said liquid crystal layer has a homogeneous alignment, the transmissive axis of said first polarization film is parallel with said liquid crystal alignment direction, and an angle between a slow axis azimuth of said retardation film and the transmissive axis of said first polarization film lies within a range from 20° or more to 25° or less or a range from 60° or more to 75° or less.

3. A display according to claim 1, wherein said retardation film is formed on the side of said first substrate near the liquid crystal layer.

4. A display according to claim 3, wherein a bireflingence of said retardation film is equal to or more than 2 times of that of said liquid crystal layer.

5. A display according to claim 4, wherein the birefringence of said retardation film is equal to 2 times of that of said liquid crystal layer.

6. A display according to claim 1, wherein said retardation film is distributed in a part of an opaque portion of said liquid crystal display in addition to said reflective display unit.

7. A display according to claim 1, wherein said retardation film is distributed in an opaque portion of said liquid crystal display and is not come into contact with a boundary between a transparent portion and said opaque portion.

* * * * *